United States Patent
Fieldman

(10) Patent No.: US 10,250,614 B2
(45) Date of Patent: Apr. 2, 2019

(54) ACCOUNT SHARING PREVENTION AND DETECTION IN ONLINE EDUCATION

(71) Applicant: STUDY SOCIAL, INC., Gainesville, FL (US)

(72) Inventor: Ethan Fieldman, Gainesville, FL (US)

(73) Assignee: STUDY SOCIAL, INC., Gainesville, FL (US)

(*) Notice: Subject to any disclaimer, the term of this patent is extended or adjusted under 35 U.S.C. 154(b) by 14 days.

(21) Appl. No.: 15/893,239

(22) Filed: Feb. 9, 2018

(65) Prior Publication Data
US 2019/0007422 A1     Jan. 3, 2019

Related U.S. Application Data

(63) Continuation of application No. 15/639,740, filed on Jun. 30, 2017.

(51) Int. Cl.
   *H04L 29/06*        (2006.01)
   *G09B 5/02*         (2006.01)
   (Continued)

(52) U.S. Cl.
CPC ............ *H04L 63/108* (2013.01); *G06F 21/62* (2013.01); *G06Q 50/205* (2013.01); *G09B 5/02* (2013.01);
(Continued)

(58) Field of Classification Search
CPC ... H04L 63/108; H04L 63/0884; G06F 21/62; G06F 2221/2151; G09B 5/065; G09B 5/02; G09B 5/12; G06Q 50/205
See application file for complete search history.

(56) References Cited

U.S. PATENT DOCUMENTS 6,256,793 B1    7/2001   Skopp
6,652,287 B1    11/2003   Strub
(Continued)

FOREIGN PATENT DOCUMENTS

WO     WO-0129733     4/2001

OTHER PUBLICATIONS

"Netflix—Unlimited TV Shows & Movies: How Does It Work?" Article dated Sep. 23, 2011 via Internet Archive (3 pages) http://web.archive.org/web/20110923163827/http://www.netflix.com:80/HowItWorks.*

(Continued)

*Primary Examiner* — Joseph P Hirl
*Assistant Examiner* — Thomas A Gyorfi
(74) *Attorney, Agent, or Firm* — Beyer Law Group LLP

(57) ABSTRACT

An application delivers educational, entertainment or work-related content including videos and documents to any computing device of a user via an account, each account being uniquely identified. Upon each login, the application checks whether the user is already logged in on another computing device and issues a warning or logs out the new device. The application also checks all user accounts periodically to determine whether one account is logged into more than one computing device. Each video or document is associated with a course and has a corresponding course code. An institution database lists courses that a student is currently enrolled in. Another database records videos watched or documents viewed via a student account. Each student account is allowed a maximum number of courses or is limited by the courses in which they are actually enrolled. The application checks whether the videos watched correspond to more than the courses allowed and if so, then access by the student account is blocked.

11 Claims, 15 Drawing Sheets

Online Education System

(51) Int. Cl.
*G06Q 50/20* (2012.01)
*G09B 5/12* (2006.01)
*G09B 5/06* (2006.01)
*G06F 21/62* (2013.01)
*H04W 12/06* (2009.01)
*G06Q 50/00* (2012.01)
*H04W 12/00* (2009.01)

(52) U.S. Cl.
CPC ............ *G09B 5/065* (2013.01); *G09B 5/12* (2013.01); *H04L 63/08* (2013.01); *H04L 63/107* (2013.01); *H04W 12/06* (2013.01); *G06F 2221/2151* (2013.01); *G06Q 50/01* (2013.01); *H04L 63/0884* (2013.01); *H04W 12/00508* (2019.01)

(56) References Cited

U.S. PATENT DOCUMENTS

| | | | |
|---|---|---|---|
| 6,988,138 B1 | 1/2006 | Alcorn | |
| 8,352,876 B2* | 1/2013 | Batarseh | G06F 3/0483 345/901 |
| 8,661,461 B1 | 2/2014 | Maurer | |
| 9,021,607 B2 | 4/2015 | Chavez | |
| 9,292,866 B2 | 3/2016 | Allaire | |
| 9,483,805 B1 | 11/2016 | Fieldman | |
| 9,560,034 B1 | 1/2017 | Fieldman | |
| 9,842,218 B1* | 12/2017 | Brisebois | G06F 21/62 |
| 2003/0208763 A1 | 11/2003 | McElhatten | |
| 2005/0144297 A1* | 6/2005 | Dahlstrom | H04L 63/101 709/229 |
| 2006/0129458 A1* | 6/2006 | Maggio | G06Q 30/02 705/14.2 |
| 2006/0195604 A1 | 8/2006 | Goodman | |
| 2006/0253324 A1 | 11/2006 | Miller | |
| 2008/0140849 A1 | 6/2008 | Collazo | |
| 2008/0168515 A1 | 7/2008 | Benson | |
| 2008/0189617 A1 | 8/2008 | Covell | |
| 2009/0083048 A1 | 3/2009 | Mandelbaum | |
| 2009/0083777 A1 | 3/2009 | St. John-Larkin | |
| 2010/0050199 A1 | 2/2010 | Kennedy | |
| 2010/0083322 A1 | 4/2010 | Rouse | |
| 2010/0228613 A1 | 9/2010 | Anderson | |
| 2010/0251386 A1 | 9/2010 | Gilzean | |
| 2010/0325737 A1 | 12/2010 | Fahn | |
| 2011/0145908 A1 | 6/2011 | Ting | |
| 2011/0166918 A1 | 7/2011 | Allaire | |
| 2011/0208616 A1 | 8/2011 | Gorman | |
| 2011/0236872 A1* | 9/2011 | Taylor | G06Q 10/06 434/350 |
| 2011/0247081 A1 | 10/2011 | Shelton | |
| 2011/0306027 A1* | 12/2011 | Bridges | G09B 5/00 434/322 |
| 2012/0054118 A1 | 3/2012 | Griffin | |
| 2012/0272336 A1 | 10/2012 | Cohen | |
| 2012/0304265 A1 | 11/2012 | Richter | |
| 2013/0004929 A1 | 1/2013 | Otwell | |
| 2013/0060661 A1 | 3/2013 | Block | |
| 2013/0152221 A1 | 6/2013 | Yin | |
| 2013/0191928 A1 | 7/2013 | Yin | |
| 2014/0038157 A1* | 2/2014 | Karpoff | G09B 5/00 434/350 |
| 2014/0103306 A1 | 4/2014 | Moon | |
| 2014/0128557 A1 | 5/2014 | Giesbrecht | |
| 2014/0157371 A1* | 6/2014 | Le Chevalier | G06F 17/30563 726/4 |
| 2014/0188937 A1 | 7/2014 | Kiefer | |
| 2014/0201527 A1* | 7/2014 | Krivorot | G06F 21/6209 713/168 |
| 2014/0214503 A1* | 7/2014 | Chircorian | G06Q 10/10 705/14.4 |
| 2014/0279128 A1* | 9/2014 | Sagebin | H04L 63/10 705/26.1 |
| 2014/0282923 A1* | 9/2014 | Narayan | G06F 21/44 726/5 |
| 2014/0380509 A1 | 12/2014 | Homer | |
| 2015/0082461 A1 | 3/2015 | Meredith | |
| 2015/0170535 A1 | 6/2015 | Negash | |
| 2015/0193651 A1* | 7/2015 | Gleim | G06K 9/00295 382/118 |
| 2015/0213236 A1* | 7/2015 | Gorodyansky | G06F 21/10 726/28 |
| 2015/0262496 A1 | 9/2015 | Cook | |
| 2015/0288692 A1* | 10/2015 | Wei | H04L 63/10 726/29 |
| 2015/0326583 A1 | 11/2015 | Kouno | |
| 2017/0140658 A1* | 5/2017 | Aluvala | G09B 5/02 |

OTHER PUBLICATIONS

Scott, Jeremy. "Netflix to Begin Enforcing One Stream Per Customer Rule" Published Sep. 7, 2011 (15 pages) http://tubularinsights.com/netflix-one-stream/.*
Martin, David W. Netflix Adds a New Restriction: Limits Customers to One Stream at a Time Published Sep. 6, 2011 (10 pages) https://www.cultofmac.com/112468/netflix-adds-a-new-restriction-limits-customers-to-one-stream-at-a-time/.*
Tuttle, Brad. "The Real Rules for Sharing Passwords at HBO Now, Netflix, Amazon Prime, and Hulu" Published Sep. 21, 2015 (4 pages) http://time.com/money/4043147/hbo-netflix-amazon-prime-share-account-password/.*
Northcutt, Curtis et al. "Detecting and preventing 'multiple-account' cheating in massive open online courses" Computers & Education 100 (2016) (pp. 71-80).*
"Managing Authentication—MoodleDocs" article published Mar. 18, 2016 (6 pages) https://docs.moodle.org/29/en/index.php?title=Managing_authentication&printable=yes.*
William H. Rice IV. "Moodle E-learning Course Development: A complete guide to successful learning using Moodle" Published May 2006 (252 pages total).*
"General help—to stream or not to stream?" Discussion forum posts from Dec. 28, 2016-Mar. 21, 2017 (7 pages) https://moodle.org/mod/forum/discuss.php?d=344942 (Year: 2016).*
"Streaming Media—MoodleDocs" article dated May 8, 2011 (2 pages) https://docs.moodle.org/25/en/Streaming_Media (Year: 2011).*
"Video—MoodleDocs" article dated Sep. 5, 2013 (6 pages) https://docs.moodle.org/25/en/Video (Year: 2013).*
U.S. Appl. No. 15/064,225, filed Mar. 8, 2016, Ethan Fieldman.
U.S. Appl. No. 15/639,740, filed May 26, 2016, Ethan Fieldman.
U.S. Appl. No. 15/064,207, filed Jun. 30, 2017, Ethan Fieldman.
U.S. Appl. No. 15/724,442, filed Feb. 9, 2018, Ethan Fieldman.
Unknown author, (Mar. 25, 2015). Snapshot of Coursehero.com. Retrieved from https://web.archive.org/web/20150325180238/https://www.coursehero.com/ on Oct. 2, 2017.
Unknown author, (Dec. 2, 2014). Snapshot of Coursehero.com login page. Retireved from https://web.archive.org/web/20141202015424/https://www.coursehero.com/login.php on Oct. 2, 2017.
Ridley, M., "Lights, Tokens, Action!:" Sun, London, p. 24, Jun. 19, 2001.
Northcutt, Curtis G., Andrew D. Ho, and Isaac L. Chuang. "Detecting and preventing "multiple-account" cheating in massive open online courses." Computers & Education 100 (2016): 71-80.
Swett, C., "Play It Again, Zune: Microsoft's Portable Music Device Is Much Superior to last year's Model, but It Still Falls Short of Industry Leader iPod," McClatchy—Tribune Business News, Nov. 13, 2007.
Yuen-C, T., "High Rollers, but in a Virtual World," McClatchy—Tribune Business News, Oct. 28, 2010.
Https://scholar.google.com/scholar Controlling account access to streaming content based . . . —Google Scholar (2 pages).
Https://scholar.google.com/scholar Limiting user success to a maximum number of content (2 pages).

\* cited by examiner

FIG. 10

SPRING SCHEDULE

Personal Information
Log out

Your Schedule - Spring 2015 — 612

| Section | Type | Course | Credits | Days | Periods | Bldg | Room |
|---------|------|--------|---------|------|---------|------|------|
| OSFD | X | PUR4800 | 03 | R | 5-7 | FLG | 210 |
| 2014 | X | COM1465 | 03 | Time to be arranged | | | |
| 2701 | X | MMC4200 | 03 | T | 8-9 | WEIM | 1064 |
|   |   |   |   | R | 9 | WEIM | 1064 |

Total Credits: 009

610

View Campus Map w/My Schedule
Show My E-Learning Links- lets you know if your classes use Sakai or Canvas E-Learning tools
Export My Schedule in ICalendar *.ics) format

View your Weekly Planner Schedule
You may print this page as a receipt

My Online Services
- Transcripts
- My Record
- Academic Programs
- Cumulative Hrs
- Certificates/Degree Application
- Verify Degree
- Verify Enrollment
- Enrollment Request
- Final Grades
- Holds
- Petition Status
- Test Scores
- Update Emergency Contact Info
- Placement
- Degree Audit
- Degree Audit
- Degree Shopping
- Excess Hours
- Surcharge
- Trading Audit
- e-Learning
- Evaluations

My Resources
- Academic Info
- Academic Learning Compacts, by Major
- Alcohol Education Tutorial
- Calendars/Deadlines
- Catalog-Undergrad
- Combined Degree
- Course Evaluations
- Distant Ed Courses
- Exam Schedules
- Forms-Registrar
- Prestigious National Scholarships
- Schedule of Courses
- Study ?? Ops
- Ugrad Experinces
- Advising Info
- Financial Info
- Grad Student Info
- Personal Info
- Other Info
- FAQs

| Timestamp | Facebook ID | First Name | Last Name | Email | School | Video/PDF Name | File Type | # Tokens used on this Video/PDF | # of Total Tokens Remaining | Access Type |
|---|---|---|---|---|---|---|---|---|---|---|
| 4/14/15:23:54 | 2059 | | | | University of | PHY2054-Exam 3 Session 9 Rev | Big Video | 15 | 55 | facebook |
| 4/14/15:13:49 | 2059 | | | | University of | MAC2234-Exam 3 Review Part 2 | Big Video | 15 | 70 | facebook |
| 4/13/15:22:07 | 2059 | | | | University of | PHY2049-Exam 1 Review Part 2 | Big Video | 15 | 40 | android |
| 4/12/15:19:52 | 2059 | | | | University of | MAC2311-Exam 3 Part 2 Review | Big Video | 15 | 140 | facebook |
| 4/8/15:23:53 | 2059 | | | | University of | CHM2046 Toth Exam 3 Review V | Big Video | 15 | 74 | facebook |
| 4/1/15:20:22 | 2059 | | | | University of | CHM2045-Exam 3 Review Part 2 | Big Video | 15 | 55 | facebook |
| 4/1/15:19:39 | 2059 | | | | University of | CHM2045-Exam 3 Review Part 1 | Big Video | 15 | 70 | facebook |

FIG. 11

| Timestamp | Facebook ID | First Name | Last Name | School | Membership Level | Video/PDF Name | File Type | # Tokens used on this Video/PDF | # of Total Tokens Remaining | Facebook/ iPhone/ iPad/ Android |
|---|---|---|---|---|---|---|---|---|---|---|
| 4/14/2015 01:49:46 PM | 2060 | Kenny | | University of Florida | All | Business Calc 2- MAC2234 - Exam 3 Review Part 2 (1-2 HOUR Video, requires 15 tokens) - http://videos.studyedge.com/bigvideo/04April/04-12-15/MAC2234_exam_3_Review_part_2.mp4 | Big Video | 15 | 55 | facebook |
| 4/14/2015 01:42:03 PM | 2060 | Kenny | | University of Florida | All | Business Calc 2- MAC2234 - Exam 3 Review Part 1 (1-2 HOUR Video, requires 15 tokens) - http://videos.studyedge.com/bigvideo/04April/04-12-15/MAC2234_exam_3_Review_part_1.mp4 | Big Video | 15 | 85 | facebook |
| 4/14/2015 01:36:25 PM | 2060 | Kenny | | University of Florida | All | Calculus 2 - MAC2312 - Exam 3 Review Part 1(1-2 HOUR Video, Requires 15 tokens) - http://videos.studyedge.com/bigvideo/04April/04-13-15/MAC2312_Exam_3_Review_part_1.mp4 | Big Video | 15 | 100 | facebook |

FIG. 12

ACCOUNT SHARING PREVENTION AND DETECTION IN ONLINE EDUCATION

CROSS-REFERENCE TO RELATED APPLICATIONS

This application is a continuation of U.S. patent application Ser. No. 15/639,740 filed Jun. 30, 2017, entitled "ACCOUNT SHARING PREVENTION AND DETECTION IN ONLINE EDUCATION," which is hereby incorporated by reference.

This application is related to U.S. patent application Ser. Nos. 15/064,207, 15/064,255, 15/064,292, entitled respectively "ACCOUNT SHARING PREVENTION IN ONLINE EDUCATION," "ACCOUNT SHARING DETECTION IN ONLINE EDUCATION" and "LIMITED TOKENS AND LIMITED VIEWING TIME IN ONLINE EDUCATION," which are hereby incorporated by reference.

FIELD OF THE INVENTION

The present invention relates generally to online viewing of videos and documents in online education. More specifically, the present invention prevents and detects account sharing via the monitoring of devices logged in and the tracking of courses watched.

BACKGROUND OF THE INVENTION

Online education is a very promising approach to education and is primarily based upon the use of computers and mobile devices for learning, in addition to the use of other more traditional resources. Individual user accounts for students are often used to provide access, to track payments, to track progress, etc., but can be ripe for fraud. For example, students may attempt to share another student's account when each student preferably should use his or her own account. In other words, a student shares his or her valid account with another student who has not signed up nor paid for the service. Or, a number of students might attempt to share a fictitious account.

Account sharing is problematic and detrimental to learning, as account sharing creates a disincentive for the education provider to produce high quality material (due to the monetary pressures of server costs, curriculum specialists, programming time, etc.) and makes it costly for the education provider to continue to provide high-quality, high-time investment resources to students. This account sharing can lead to a proliferation, for instance, of subpar or generalized material. The cost of producing high quality, specialized material is high, and account sharing makes it untenable for education providers to continue to provide resources at a high level. This leads to a "race to the bottom," in which education providers offer generalized material or material that does not involve significant monetary or time investment on the part of the education provider. This, in turn, affects the student, as the student will no longer receive the high quality service she or he initially anticipated. Furthermore, sharing accounts makes it difficult for the student to benefit from data-driven analytics that suggest the proper material or courses for a student, given the student's usage of the material and the student's performance The student's learning experience is degraded and does not benefit from the strengths of online education, namely, personalization and quality of content.

In addition to account sharing in online education, account sharing can be problematic in other online areas such as entertainment, work-related video streaming, subscription services (e.g., a single corporate account for a publisher that is shared), accounts with benefits (like free shipping, discounts), etc.

In particular, it can be beneficial to prevent account sharing before it occurs, and also, to detect account sharing after it occurs, assuming that some amount of sharing will occur. Accordingly, improved techniques and systems are desired.

SUMMARY OF THE INVENTION

To achieve the foregoing, and in accordance with the purpose of the present invention, an online system for education, entertainment or other fields is disclosed that prevents and detects account sharing using various techniques.

In a first embodiment, account sharing is prevented by checking each new login of a user against a database of user accounts that are already logged in on computing devices. If the user account is logged in on more than one computing device then the account may be blocked, a device may be logged out, or a warning may be given.

In a second embodiment, account sharing is detected by first allowing any number of users to log in to any number of computing devices. Course content is delivered to the computing devices. Periodically, a review of all user accounts is triggered and if a particular user account is logged in on more than one computing device then the account may be blocked, a device may be logged out, or a warning may be given.

In a third embodiment, account sharing is prevented or detected by determining if a single user account is being used simultaneously on different computing devices.

In a fourth embodiment, non-simultaneous use of a single user account may be prevented or detected depending upon the elapsed time between actions on the two devices. Such use may be allowed if the devices are different and a certain amount of time has elapsed.

In a fifth embodiment, account sharing may be prevented or detected by determining a distance between two different computing devices. Position data, accelerometer data, elapsed time, and content being viewed may all be used to allow or deny access to content from the second computing device.

In a sixth embodiment, account sharing is prevented by comparing the number of courses for which a student is watching videos or viewing documents against an allowed number of courses. The allowed number of courses is a default number per account, or may correspond to the actual number of courses that a student is currently enrolled in. If a student attempts to view or download course content for a number of courses that is greater than the courses allowed, then access to all course content may be blocked for that student account.

In a seventh embodiment, account sharing is detected by first allowing any number of students to log into any number of computing devices. Course content is delivered to the computing devices as requested. Periodically, a review of all student accounts is triggered and if a particular user account has watched videos or viewed documents corresponding to a number of courses that is greater than the allowed number of courses then that account may be blocked, a device may be logged out, or a warning may be given.

Tracking the total number of courses for which a student is watching videos is another form of account sharing detection or prevention that may be done in addition to tracking specific course numbers. Tracking the total number also has the advantage of being simple—some universities or institutions may not be able to readily communicate the relationship between specific courses in order to track and compare specific course numbers.

BRIEF DESCRIPTION OF THE DRAWINGS

The invention, together with further advantages thereof, may best be understood by reference to the following description taken in conjunction with the accompanying drawings in which:

FIG. 5 is a flow diagram describing preventing account sharing by monitoring devices logged in.

FIG. 6 is a flow diagram describing detecting account sharing by monitoring devices logged in.

FIG. 10 is an example from a school database showing a student's schedule.

FIG. 11 is a screenshot of a report of a database logging videos watched by a particular student account.

FIG. 12 is a screenshot of another report of a database logging videos watched by a particular student account.

DETAILED DESCRIPTION OF THE INVENTION

Although embodiments of the invention may be used in a variety of contexts, in one specific context online education is promoted and managed by an education company via a Web site or a mobile application accessible from any computer or mobile device. A student seeking educational assistance with K-12 school or college coursework or with standardized tests (e.g., GRE, LSAT, MCAT, etc.) uses the Web site or mobile application to sign up or log in to a student account in order to access resources such as videos, electronic documents, printed documents, live review sessions, one-on-one consultations with tutors, etc.). Access to the relevant content is then provided via an education application hosted on a server computer. In addition, the present invention may be used in the context of online delivery of entertainment or work-related content such as videos, movies, photographs, etc., and is not necessarily limited to education.

System Block Diagrams

Figure 1:
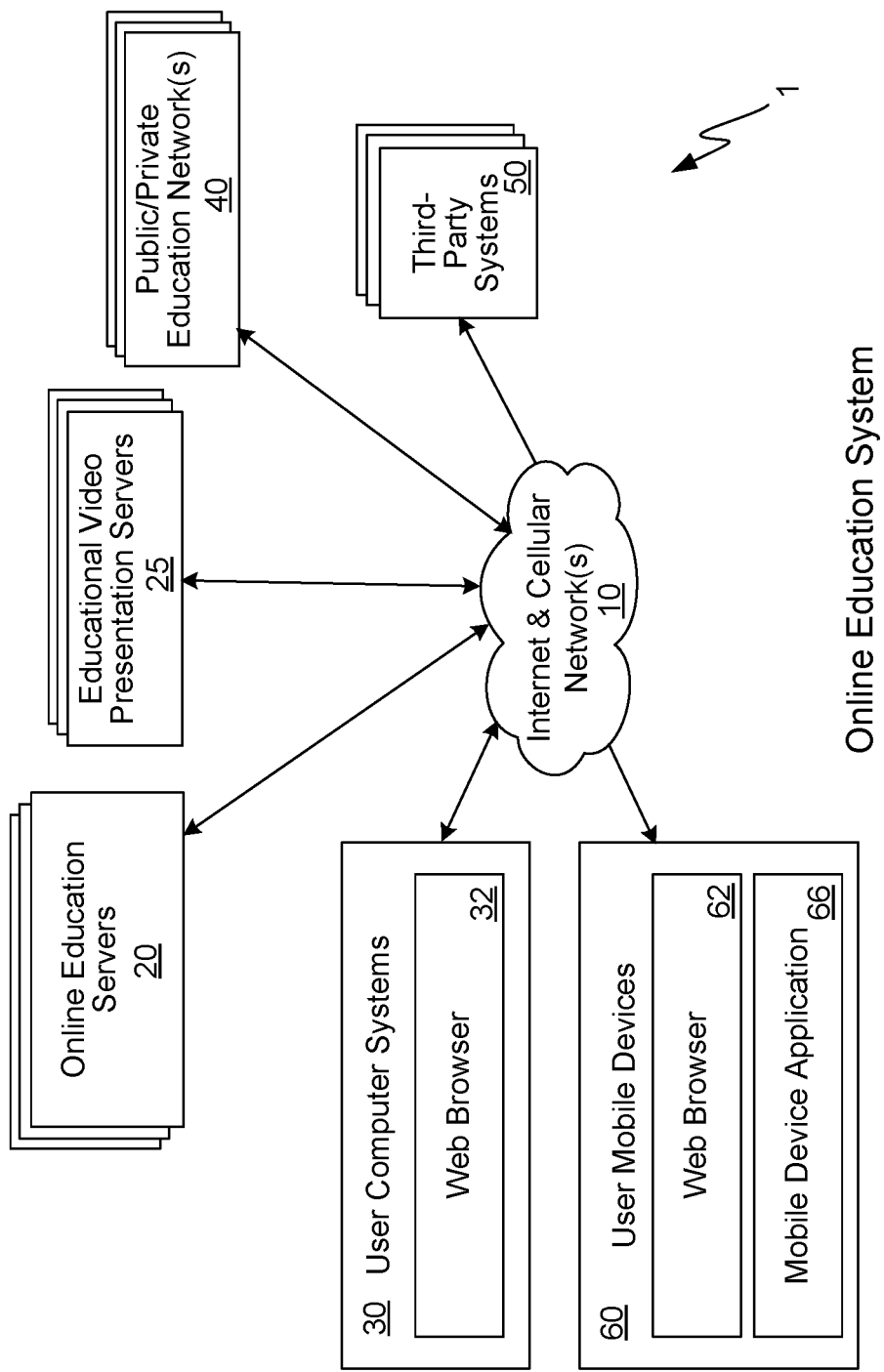
FIG. 1 is a simplified block diagram of a specific embodiment of an online education system.

FIG. 1 is a simplified block diagram of a specific embodiment of an online education system 1, which may be implemented via a computerized data network to provide the service of the education company. As described in greater detail herein, different embodiments of system 1 may be configured to provide various types of functionalities generally relating to online education. As shown, system 1 may include one or more of the following types of computers, systems, networks, Web sites, databases, mobile devices, etc.

Figure 2:
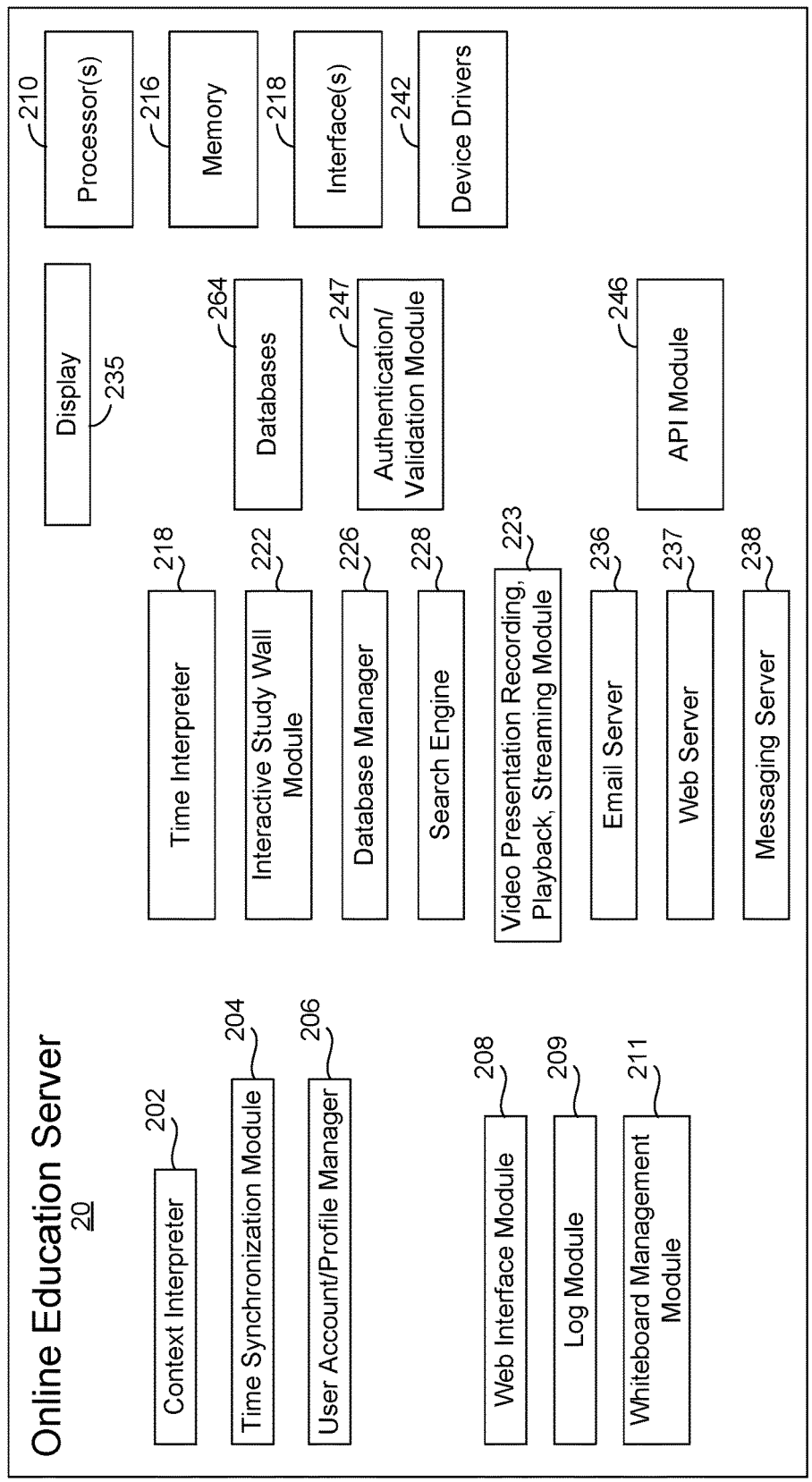
FIG. 2 is a block diagram of software modules and hardware components of an online education computer server in accordance with a specific embodiment.

Online education computer servers 20 perform various functions such as those described in FIG. 2. Educational video presentation computer servers 25 include videos of educational courses, videos of tutors presenting review materials, PDF and other electronic documents, etc., all used by students who have access to system 1. Public/private education networks 40, include, for example, student information systems, student data management systems, course management systems, etc., used by schools, colleges, and universities.

User computer systems 30 include any suitable desktop, laptop, tablet computer, etc., operable to provide the various types of online education described herein. User mobile devices 60 include any suitable mobile telephone, personal digital assistant, etc., also operable to provide online education. Internet and cellular networks 10 include suitable wired or wireless networks used for communication between the entities of system 1. Third-party systems 50 include computer servers, Web sites, software, etc. of social media company sites such as Facebook, Twitter, Instagram, LinkedIn, etc.

FIG. 2 is a block diagram of software modules and hardware components of an online education computer server 20 in accordance with a specific embodiment. These modules and components may be implemented upon a single computer or upon multiple computers in communication with one another.

Context interpreter 202 is operable to analyze contextual criteria relating to a detected set of events and automatically determine or identify one or more contextually appropriate responses based on the contextual interpretation of the detected events. Contextual criteria include: location-based criteria; time-based criteria; identity of a user; user profile information; transaction history information; recent user activities; and proximate business-related criteria. In particular, this module tracks recent activities by users (i.e., watching videos, downloading PDF files, etc.) that may occur in multiple courses.

Time synchronization module 204 is operable to manage universal time synchronization (e.g., via NTP or GPS). Module 206 manages the user accounts and a profile for each user. Accordingly, it maintains a database of user profiles (user identifying information, educational institution affiliation, etc.), and one or more databases of user accounts that includes type of account or plan for each user, payments for each user, allowed number of courses per semester (if applicable), a log of videos or documents watched or downloaded for each user account, etc. Search engine 228 is operable to search for transactions, logs, items, accounts, course codes, users, videos, documents, or options in the online education system databases or in an education network 40. Time interpreter 218 is operable to modify or change identifier activation and expiration times based on various criteria such as time, location, transaction status, etc. In particular, this module tracks the times when videos, PDFs and other content are viewed or downloaded and allows for the expiration of content after a pre-set time period. This module also tracks the time between watching of videos.

Authentication/validation module 247 includes user identifiers, passwords, software/hardware identifiers, SSL certificates, etc., which are operable to perform various types of authentication and validation tasks such as: verifying/authenticating devices, verifying/authenticating users, verifying passwords, passcodes, SSL certificates, biometric identification information and/or other types of security-related information, and verifying/validating activation or expiration times, etc.

Interactive study wall module 222 is operable to implement various types of "wall" functions such as allowing a user to post text and images to a wall, or to read postings on a wall. White board management module 211 is operable to perform various types of electronic whiteboard functions. Video presentation recording, playback, and streaming module 223 is operable to perform the operations relating to the video presentation techniques described herein and may also be present on servers 25. Database manager 226 is operable to handle various tasks relating to database updating, database management, database access, etc., using, for example, any number of databases 264. In one specific embodiment, one of databases 264 is a NoSQL in-memory backend database. This type of database is highly performant and allows almost instantaneous updates, updates that would normally not be possible with a standard SQL-based database.

Log module 209 is operable to generate and manage transactions history logs, system errors, connections from APIs, etc. Web interface module 208 is operable to facilitate and manage communications and transactions with other Web portals. API module 246 is operable to facilitate and manage communications and transactions with other APIs of other systems or networks, such as networks 40 or systems 50.

Processor 210 may include one or more commonly known CPUs, which are deployed in many of today's computers and consumer electronic devices. Memory 216 may include volatile memory (e.g., RAM), non-volatile memory (e.g., disk memory, FLASH memory, EPROMs, etc.), unalterable memory, and other types of memory. Interface 218 includes wired or wireless interfaces. Device drivers 242 includes functionality similar to one or more computer system driver devices generally known to one having ordinary skill in the art. One or more displays 235 may be implemented using, for example, LCD display technology, or other types of conventional display technology.

E-mail Server 236 provides various functions and operations relating to e-mail communications. Web server 237 provides various functions and operations relating to Web server communications. Messaging server 238 provides various functions and operations relating to text messaging or other social network messaging activities and communications.

Figure 3:
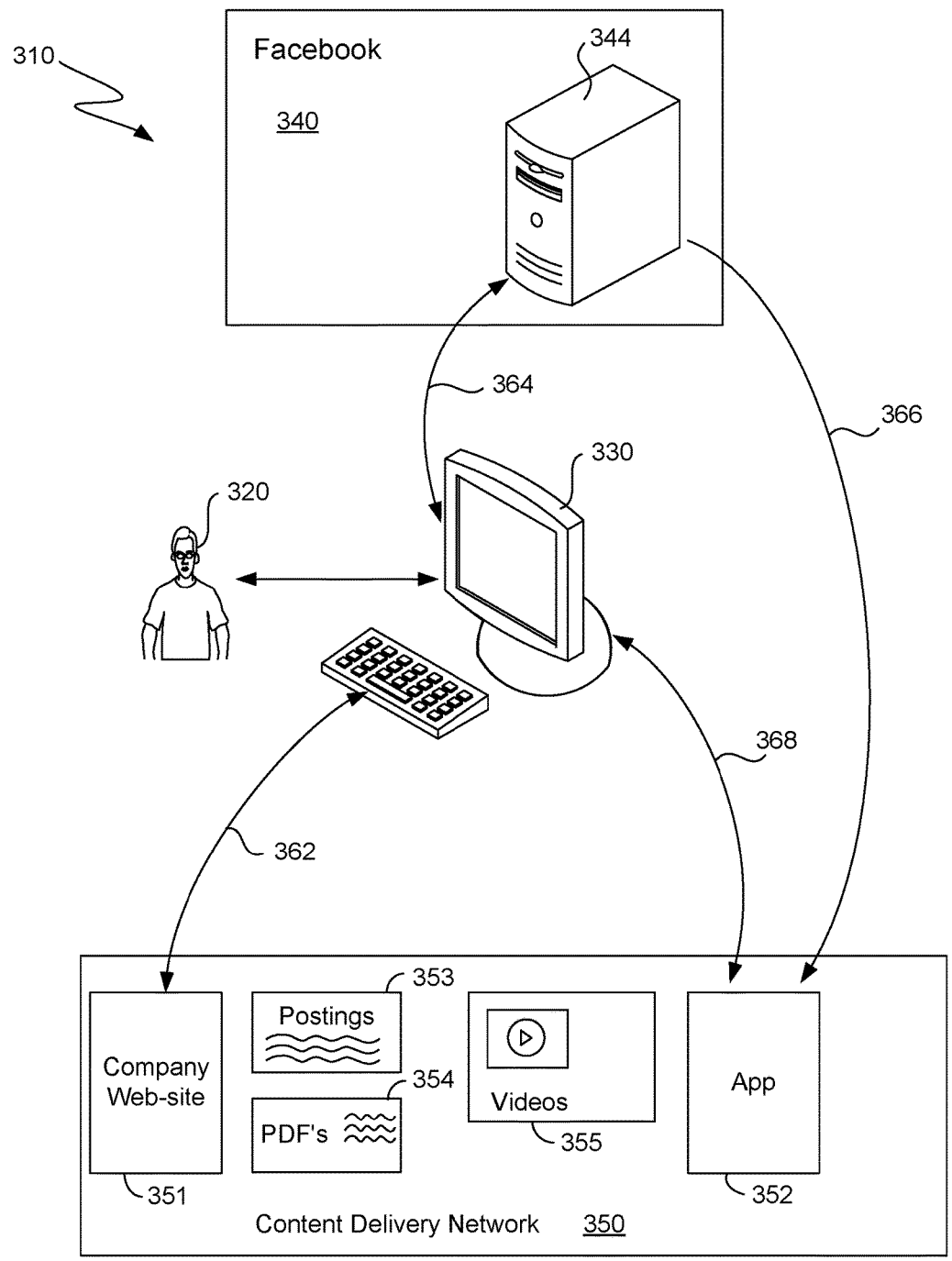
FIG. 3 is a block diagram of an authentication and delivery system according to one embodiment.

FIG. 3 is a block diagram of an authentication and delivery system 310 according to one embodiment. Included is a user 320 interacting with a computer 330, such as any of devices 30 or 60 mentioned above. There may be any number of users, each having a computer, that are accessing network 350 at the same time. Also included is a variety of information hosted upon a content delivery network (CDN) 350. The CDN may be any of a variety of networks such as Akamai, Limelight, Amazon Web Services, etc., and the information need not be hosted upon a single one of these networks, but may be spread across different networks. The CDN may include any or all of servers 20 and 25. Included is a Web site of the education company 351, an education application 352 (mentioned above), user postings 353 (e.g., textual comments, photographs, etc. commonly known as a "Wall"), PDF files 354 or any other type of electronic documents and files, and videos 355 such as videos from tutors or professors, videos of live classes, or other instructional videos. Education application 352 may include any or all of the modules and components of FIG. 2.

Preferably, any suitable streaming technique is used to deliver a video or document to the student's computing device. In this manner, the student is not provided with possession of the complete video or document (as if he or she had been able to download the video or document) and is not able to view a video or document as often as he or she likes for only one price. Because the video is being streamed, the education application may terminate the streaming if it is attempted after the actual time limit.

Facebook 340 is one example of any of a variety of third-party social media companies that may provide authentication services for the education company in order to authenticate any of its users. Computer 344 is one or many computers under control of the third-party social media company that provides the authentication services. Of course, computer 344 may be hosted on yet another content delivery network, yet still be under control of the third-party social media company. Or, authentication computer 344 may be under control of the education company, may be one of computers 20, and may implement authentication module 247 as shown in FIG. 2.

User Authentication via Web Site

One technique is to require each user to log in using the login credentials and system of a third-party social media site, e.g., Facebook, Twitter, Instagram, LinkedIn, Snapchat, Vine, Google Pus, etc. Preferably, students are encouraged or required to use their actual Facebook account (for example) in their own name, and not a fictitious account.

In this embodiment, the education company has developed an education application that is hosted within a page of the social media site Facebook that requires Facebook login credentials instead of allowing access using other login credentials. Each user is required to log in first to their Facebook account using their own Facebook login credentials (user name, password) in order to access the online education application. As mentioned above, even though a user desires to use the services of the education application developed by the education company, the user accesses those services using his or her login credentials belonging to a particular third-party social media company.

In a first step the user uses a browser on the computer 330 to view the Web site of the education company as shown at 362, but at this point has not been authenticated and does not have access to any of the services of the company, such as the user's account, the ability to watch instructional videos, contact tutors, post to or read from the Wall, use of the tutor matching service, etc. The education company Web site provides basic information such as introductory videos, information on services and pricing, lists of available courses, information on tutors, etc. Included on the Web site is a button or link allowing the user to log in to the education application using their login credentials from one of a variety of social media companies such as Facebook, Twitter, Instagram, LinkedIn, etc.

Preferably, the login credentials that a user uses to log in to the education application are credentials from a social media company that requires each user to have a personal account, i.e., an account that is personal to an individual where anything occurring within this account is attributed to the individual. In a next step, the user selects the login button (in this example, "Login with Facebook") from the Web site and the user's browser is then redirected to a Facebook computer server, such as server 344 as shown at 364. When redirected, server 344 is provided with information (such as a link, URL, network address, etc.) allowing the server to eventually confirm authentication to the education application 352 via communication link 366. At this point, the user is now communicating with the social media company which will provide the authentication.

Next, the user is presented via his browser with a standard Facebook login page from server 344, requesting the user's user name and password, or similar credentials. If the user chooses not to supply his or her Facebook credentials, or supplies incorrect credentials, then he or she will not be allowed access to the education application and will not be allowed to use any of the services of the education company. Assuming that the credentials are supplied, then server 344 authenticates these credentials using information stored under control of the third-party social media company. In other words, the credentials can only be authenticated by the third-party social media company and not by the education company. The user may also be advised by Facebook that continuing means that the education company will receive certain user information held by Facebook such as the user's public profile and e-mail address.

Next, server 344 provides, as shown at 366, certain personal user information held by Facebook such as first name, last name, e-mail address, a third-party unique identifier, "friend," contact or link count, demographic information like language, gender, interests, etc., to the education application 352. Of course, the type and quantity of information provided may vary depending upon the third-party social media site and the needs of application 352. In a specific embodiment in which tracking of user accounts and device information is useful, a NoSQL in-memory backend database 264 is used to store this type of information. When a user first is authenticated, each user account (e.g., name, third-party identifier, e-mail address, or other identifier unique within system 310), along with a unique user session identifier (browser cookie, mobile application identifier, etc.) and user agent information (browser, operating system, software version, e.g., Flash, Jaysacript, etc.) is stored in the NoSQL database. Any subsequent action a user takes (e.g., stream or download a video, pause a video, view or download a PDF file, logout, etc.) will also be recorded in this database under their account. This information is provided from the user device 330 to application 352 via server 344. Each action (authenticate, login, stream video, etc.) is time stamped when entered into this in-memory database.

Assuming that the provided information identifies a valid user within the education application (or identifies a new user), then the education application provides content as shown at 368 so that it becomes hosted within the Facebook page as shown on the user's browser. In other words, the user's browser may display not only a portion of a Facebook page from computer server 344, but also hosted within it, the content of the education application from CDN 350. Techniques such as use of frames and iFrames may be used. Of course, it is also possible that the content of the education application will appear exclusively within the user's browser and that information from the third-party social media page will not appear. Thus, once the user has been authenticated by the third-party social media site, the user may now interact with the education application 352 provided by the education company.

In a modification of this embodiment, the user may first log into the Web site of the social media company, be authenticated by that social media company (e.g., Facebook), and then search for the name of the education company (e.g., "Study Edge") within the Facebook applications. Once found, the education application is selected, Facebook passes the user's information to the education application, and the user's browser is redirected to the education application 352 in order to display the education application hosted within a Facebook page. The user may then interact with the education application as described above.

User Authentication via Mobile Device

Similar to the above embodiment in which a user uses a browser on their computer to access the education application, a user may also use a browser on a mobile telephone (or other mobile device) in order to first access the education company Web site and then be authenticated by the third-party social media site as described above. The user would then have access to the education application in a browser on their mobile telephone as described above without the need for a special application on their mobile device.

In a more common embodiment on a mobile telephone, a user first downloads a mobile application from the education company to the mobile telephone in order to access the education application on the content delivery network. Instead of interacting with a computer 330, user 320 interacts with his or her mobile device 60 that is capable of downloading and executing a mobile application or "app." The user downloads and installs this application from a repository of mobile applications such as the "App Store" for Apple telephones or "Google Play" for telephones that use the Android operating system, by searching for the mobile application within a social media Web site (such as within Facebook), or from a similar source.

The user selects this mobile application on their telephone and is then prompted to log in with their Facebook credentials (for example). At this point, the telephone is communicating with a Facebook computer server which is requesting the user's credentials. Next, the user supplies his or her Facebook login credentials to the Facebook server by entering information on the mobile telephone (as shown at 364) and Facebook then authenticates those credentials.

Next, assuming that the user is authenticated, the Facebook server passes back the user identifying information which it controls (name, e-mail address, third-party unique identifier, etc.) to the mobile application on the telephone (instead of passing the information via 366 as described in the above embodiment). The mobile application, in turn, then passes this same information to the education application 352 within the content delivery network. The mobile application will also pass a unique user session identifier and user agent information to application 352 as described above for entry into database 264 along with the user information. These entries are time stamped as described above. Next, the mobile application retrieves content from the education application and displays that content on the mobile telephone so that the user may interact and use the services of the education application, such as shown at 368.

In this embodiment the education application executes exclusively on a mobile telephone and is not hosted within Facebook page as described above. Thus, although content from the education application will appear on the user's telephone, this content may appear in a different form and may not include any Facebook content. Thus, the user may then interact with the education application using the mobile application on their telephone after being authenticated by a third-party social media site.

Identification of Access by More Than One Device

In order to prevent or detect that students are sharing accounts, a first embodiment involves identifying when more than one computer is logged into the application using the same user account. As shown in FIG. 3, a user 320 logs into the application using a computer 330 (or other suitable electronic device such as a tablet computer, mobile telephone, etc.) and it is intended that the user will then stream videos, view PDF files, etc., to that single electronic device. It is unlikely, and in fact, not allowed, that a single user will log into the application using two or more different electronic devices. Because of the nature of the videos and files being displayed to the user, it is expected and only necessary that a user log in to his or her account using a single electronic device. Should it be detected that a second electronic device is being used to log in to the application using a user account that is already logged in, the application may prevent access by the second electronic device or display a warning message. Or, the application may allow access by any electronic device at any time, but may then periodically check to detect if a user account is being used on two more electronic devices. If so, the user may be logged out except for a single electronic device.

Figure 4:
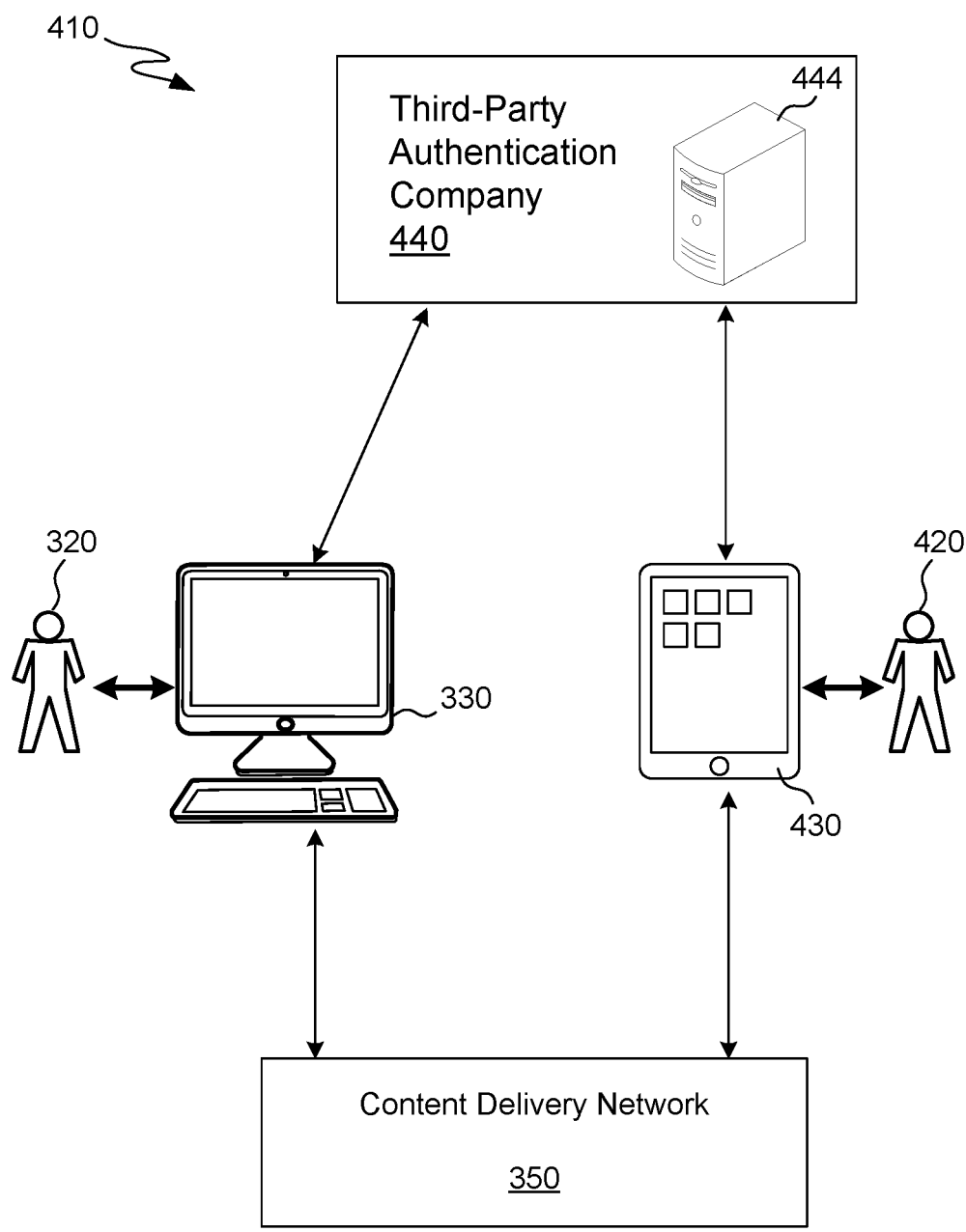
FIG. 4 is a block diagram of an authentication system showing access by more than one device.

FIG. 4 is a block diagram of an authentication system 410 illustrating access by more than one device. Included is a user 320 interacting with a computer 330, as well as any number of other users 420, each having a computing device 430, that are accessing content delivery network 350 at the same time. Each user may access network 350 as described above. Third-party authentication company 440 is any of a variety of third-party companies that provide authentication services using authentication server 444 for the education company in order to authenticate any of its users. Authentication may occur as described above.

Once user 320 logs into application 352, videos 355 may be downloaded or streamed to his or her computing device 330. At a subsequent time, however, if user 420 attempts to also log in to application 352 using the login credentials of user 320 then system 410 may display a warning message on device 430 or may prevent user 420 from logging in. Even if user 320 attempts to log in on device 430 while also logged in on device 330 the system will still display a warning message or prevent device 430 from logging in using the same login credentials. In addition, system 410 may allow both devices 330 and 430 (or even more devices) to be logged in at the same time using the same login credentials of a single user. Periodically, though, system 410 will determine how many electronic devices are logged in using the same login credentials and may log out all devices that are using the same login credentials except for a single device. For example, if both devices 330 and 430 are logged in using the information of user 320, then at a subsequent time the system will log out device 430 and leave device 330 logged in, or vice-versa.

Prevent Account Sharing via Devices—Flow Diagram

Figure 5:
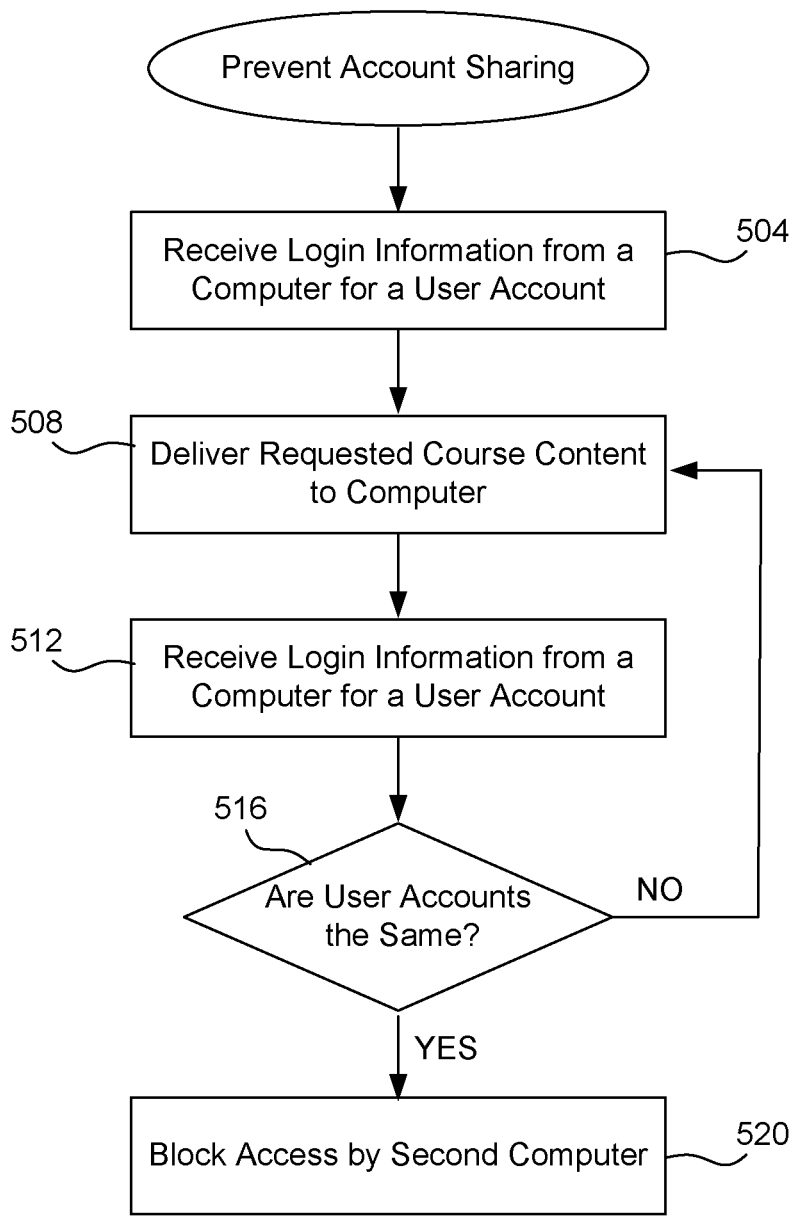

FIG. 5 is a flow diagram describing an embodiment in which account sharing may be prevented. In a first step 504, login information for a particular user account is received from a user computer 330 and the user account is granted access to educational content from a server computer 350 via the education application 352. For example, a user supplies login credentials and is authenticated using any of the techniques described above, and, once authenticated, authentication server 344 provides, as shown at 366, certain personal user information such as name, e-mail address, unique identifier, etc., as well as session and device information, to the education application 352 to indicate that the user computer is now authorized to access educational content. Of course, other types of login credentials and authentication techniques may also be used in addition to those described above, as long as an authentication server provides to the education application 352 some type of identifier identifying the user account to be logged in.

In addition, while the user is logged in to the education application, all user actions are recorded in the in-memory NoSQL database 264 and provided with a timestamp. Virtually any click, touch or selection on a computing device while within the education application may be considered an action. For instance, a user selecting, starting or pausing a video, posting information to the wall, logging in or logging out, selecting or downloading a PDF file, etc. In a specific example, selecting, starting or stopping any educational content is considered an action. This recording of actions by a user allows a user to be logged in on one device but not be considered active on that device if no actions are occurring on, or have occurred on that device in a certain amount of time. In a variation, the application sends an updated status to the in-memory NoSQL database 264 once per second, or faster for any user account logged in. This allows a user who is logged in, but not actively watching or consuming content, to also count as an active user session for the purposes of preventing multiple accounts.

At some point, the user will request educational content associated with a particular course such as videos 355, documents 354, and may wish to post or read information via postings 353. Accordingly, in step 508 the requested course content will be delivered to the user computer 330, which may be a user computer system 30, a user mobile device 60, a tablet computer, etc. If a video, the video may be streamed from delivery network 350 to the user computer or may be downloaded to the computer for later viewing. Documents 354 may also be displayed on the user computer for viewing while logged in or may also be downloaded. The user may then view any course content he or she wishes either at that time, or by logging out and logging in at a future time (if course content is allowed to be downloaded).

Of course, it is also possible that the person who is the actual owner of the user account will illicitly share that account with another person and this other person will then attempt to login to the education application. Accordingly, in step 512 a second person (or even the first person) attempts to login using the same login credentials as before but on a different computer, for example, mobile telephone 430 as shown in FIG. 4. The authentication server 444 will authenticate the login credentials and then send login information and session and device information via link 366 to the education application indicating that a second computer desires to be logged in under the same user account.

In step 516 application 352 take steps to determine whether identifying information for the user account received in step 512 identifies the same user account already logged in step 504. In one embodiment, this check occurs as each login information arrives from authentication server 444 and before application 352 allows access to the educational content.

This comparison of step 516 may be performed using the NoSQL database. As mentioned earlier, user information and device information for the user account logged in in step 504 has been entered into this database under identifying information for this user account, which includes a unique session identifier and the user agent information. The incoming identifying information for the user account of step 512 also includes the user account, and a session identifier and the user agent information. The information from step 512 may be entered into the database before comparison or may be compared directly with the information from step 504. If the user account from step 512 also matches with another active user account in the database (for example, the user account from step 504), and the information from step 512 includes a different user agent from the user agent of step 504, then this indicates that a single user account is being used on two different electronic devices. On the other hand, if the user account from step 512 does not match with another active user account in the database than this indicates that the user account is only being used on a single electronic device.

Other techniques may be used to determine if a different device is being used. Device information passed from the computing device may include user agent, IP address and a unique device identifier such as a browser cookie or mobile application identifier. Generally, if the user agent is different this indicates that a different device is being used. In addition, the IP address or the unique device identifier may be used to determine that a different device is being used. Or, a combination of any of the above device information may be used.

Therefore, in step 516 it is determined that the incoming login information does not identify a user account that is already logged in, then control returns to step 508 where the currently logged in user account may continue to request course content. But, if it is determined that the request in step 512 is for a user account that is already logged in on a different computer, then control moves to step 520 where desired access by the second computer is blocked.

Simply being logged in on two devices under the same user account may be prevented or detected as follows. While a user is logged in to the education application, the application sends an updated status to the in-memory database once per second, or faster for that user session. This allows a user who is logged in, but not actively watching or consuming content, to also count as an active user session for the purposes of preventing multiple accounts. Thus, step 516 may block access simply if a second device is trying to log in (or already has) to the same user account.

In a variation on this embodiment, the checks performed in the above step 516 are not necessarily performed when the second person logs in under the same user account, but are performed when the second person requests educational content. In other words, a second device (or even more devices) are allowed to log in using the same user account, but as soon as a second device attempts to view any of the educational content (e.g., requests to download or stream a video) then the checks described above in step 516 are performed. This can help reason prevent false positives, for instance, when a student starts watching a video on their laptop computer at home and the pauses it, continues watching a video on their telephone while traveling to campus, and then later watches the video on a desktop computer in a computer laboratory on campus. These uses are all legitimate, and since the check is performed only when the student attempts to begin streaming a video, each use will be allowed.

Figure 7:
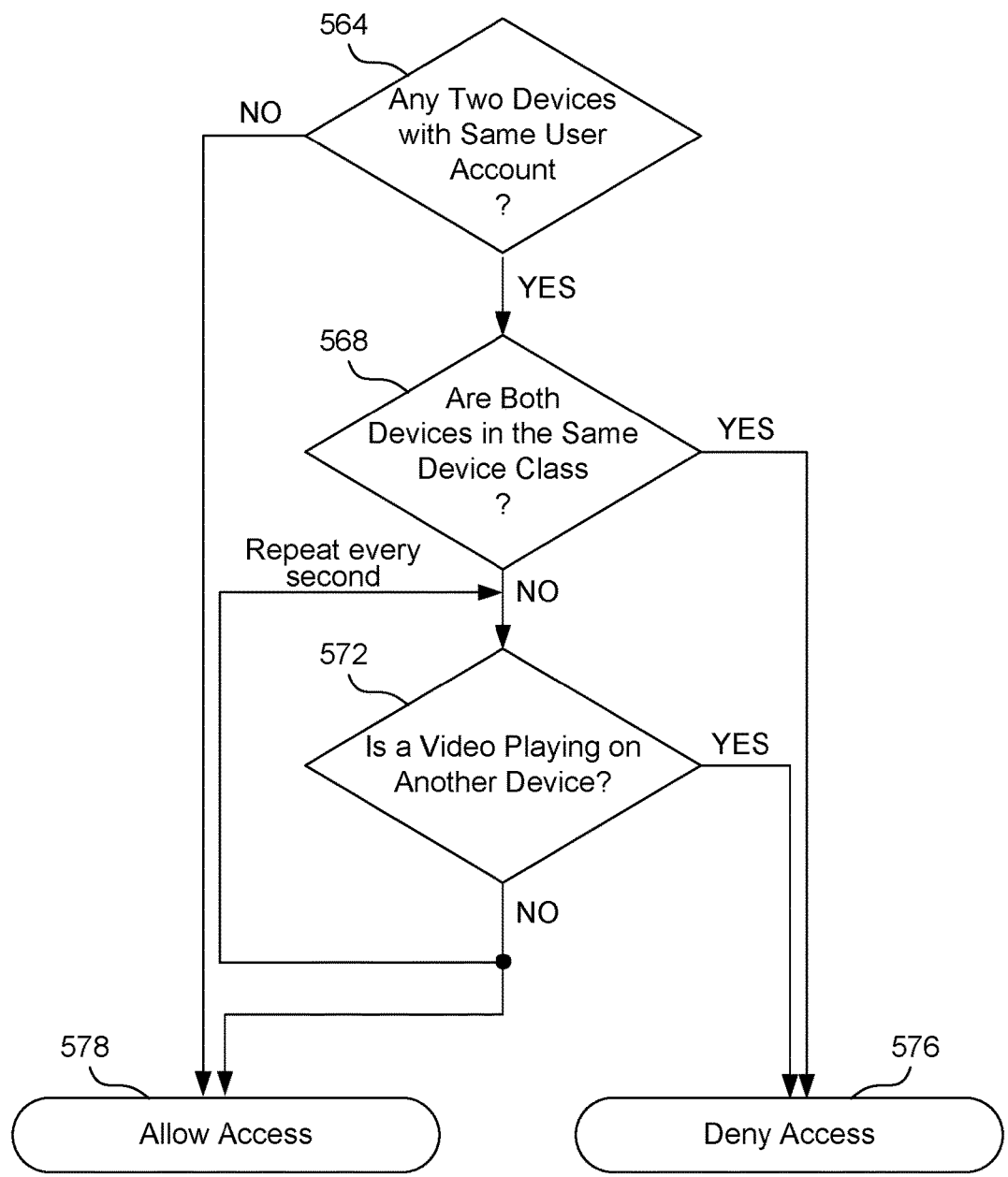
FIG. 7 is a flow diagram describing another specific embodiment for implementing step 516.

FIG. 7 is a flow diagram describing another specific embodiment for implementing step 516. In this embodiment, a user account may be logged into more than one computing device, as long as those devices are different, and as long as a video is not already playing on the previous device. This embodiment prevents simultaneous use of a user accounts by different devices.

In step 564 it is determined using the NoSQL database, for the user account of step 512, whether another computing device is already logged in under that same user account. If there is no other device logged in under that same user account then access is allowed in step 578 and control moves to step 508. If there is such another device and it is in the same device class (i.e., both are mobile telephones, both are tablet computers, etc.), then in step 576 access by the second device is denied and control moves to step 520 (i.e., it is unlikely that a single student logs in using devices of the same class). If the devices are in different classes (e.g., one desktop computer, one mobile telephone, etc.), then it is determined in step 572 whether a video is already streaming on the first device from step 504 (i.e., if not, it is likely that a single student may have neglected to log out from another one of his or her devices). Thus, if the devices are in different classes, and there is no video being streamed on the first device, this indicates that a single student has logged in under his or her account on the first device, is no longer using that device, and is attempting to log in (or stream) on a different device. If so, access is allowed in step 578 and control moves to step 508.

On the other hand, if there is a video playing on the first device, this indicates that another student is likely using the first device under the same user account; accordingly, in step 576 access is denied to the second device and control moves to step 520. As mentioned above, these steps make occur when a login is attempted from a second device, when content is requested from a second device, or periodically, such as every few hours, every day, or every week. In particular, the check in step 572 may be performed more frequently, such as every second. Also, step 572 may determine whether a video or PDF file has been downloaded or is being viewed on the second device instead of or in addition to checking whether a video is streaming on the other device.

In a variation on the embodiment of FIG. 7, step 568 does not exist and control moves directly from step 564 to step 572. Because it is possible that a student may be working in a computer laboratory and watching videos, and may move from one computer to another, it is allowed that the student be logged into more than one of these computers as long as videos are not playing on each computer at the same time. Thus, in step 572, as long as a video is not playing at the same time on another computer, a student will be allowed to be logged into more than one computer at the same time. This embodiment may be restricted to desktop computers, i.e., a student would not be allowed to be logged into more than one mobile telephone at the same time, or more than one laptop computer tablet. Because device type information is collected when a student logs in, the system knows the type of device being used. Further, when a student uses different computers from within the same laboratory, the IP address is the same as a firewall normally uses a single IP address to communicate with the outside world; thus, the system knows the student is in the same network (e.g., a laboratory). The system will know it is a different session (because of the unique identifier created when the user logged in).

Returning now to FIG. 5, step 520 may be implemented in different manners. In one embodiment, a simple warning message is provided to the users on one or both of the computers logged in under the same user account warning that only a single computer may be logged in under a user account at a time. Alternatively, the second computer 430 is not allowed to log in to the content delivery network, access to the educational content is denied, and a suitable message may be displayed on the second computer. In a further embodiment, the application 352 may also log out computer 330 in addition to denying access by computer 430. Yet further, the policy of the education company may be that only the latest login attempt is allowed for a single user account, meaning that once control moves to step 520 that computer 330 will be logged out, but telephone 430 will be allowed to log in to the network 350. Or, the education application may deny access only to video viewing and streaming, or to PDF viewing and downloading to the second device when a duplicate session is suspected. Access to the class wall and other account-related activities would still be allowed. If so, in step 520 access by the second device to videos and PDF files is blocked, but other account access is allowed.

Once a user or computer is logged out, that computer is then unable to stream, view or download any videos 355 or documents 354. If a computer is logged out while a user is viewing a video, downloading or streaming a video, then that viewing, downloading or streaming is terminated at that time. In this fashion, this embodiment of FIG. 5 prevents a user from sharing his or her account with another user.

Detect Account Sharing via Devices—Flow Diagram

Figure 6:
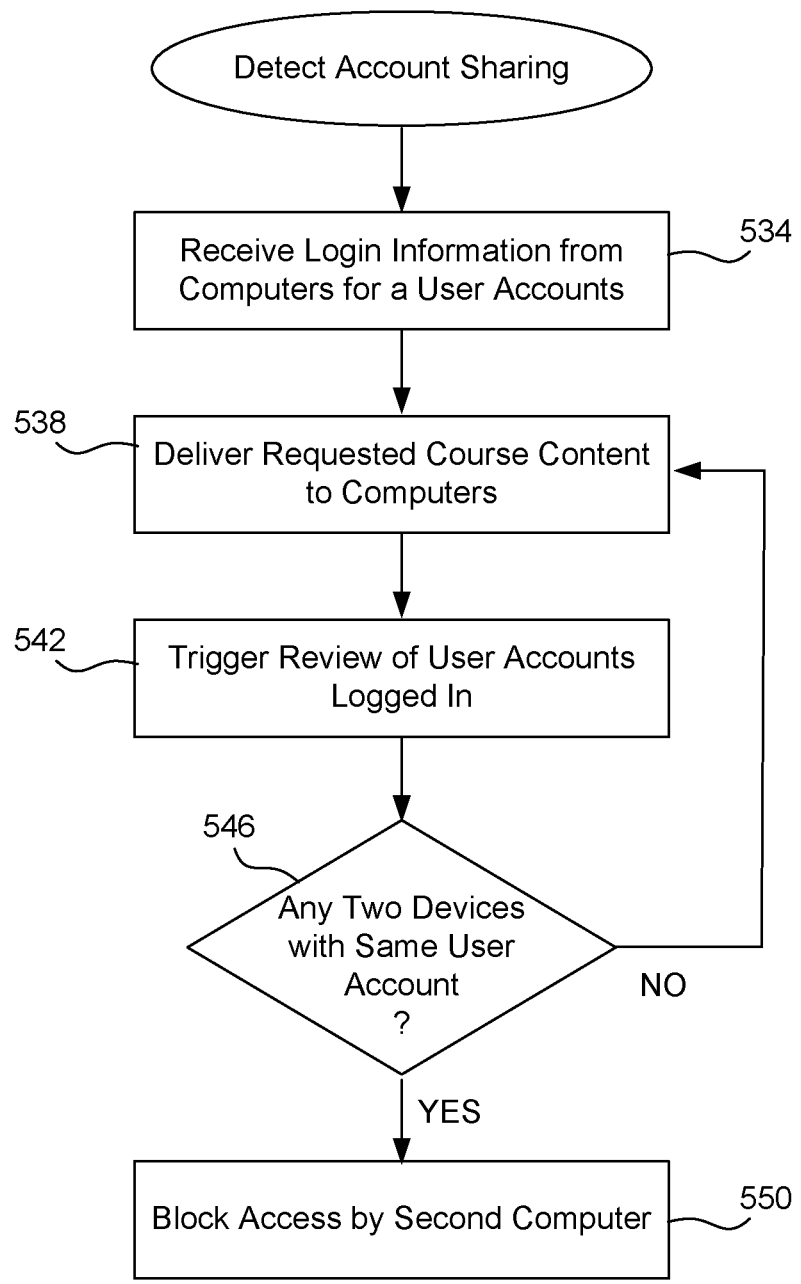

FIG. 6 is a flow diagram describing an embodiment in which account sharing may be detected. In a first step 534, login information for any number of user accounts is received from user computers (e.g., computers 330 and 430) and each user account is granted access to educational content from a server computer 350 via the education application 352. For example, users supply login credentials and are authenticated using any of the techniques described above, and, once authenticated, authentication server 344 provides, as shown at 366, certain personal user information for each user such as name, e-mail address, unique identifier, etc., to the education application 352 to indicate that each user computer is now authorized to access educational content. Thus, an authentication server provides to the education application 352 some type of identifier identifying each user account that is now logged in on a computer.

It is possible that a person who is the actual owner of a user account will illicitly share that account with another person and this other person will then attempt to log in to the education application. In other words, a second person (or even the first person) logs in using the same login credentials as before but on a different computer, for example, mobile telephone 430 as shown in FIG. 4. The authentication server 444 will authenticate the login credentials and then send login information via link 366 to the education application indicating that a second computer desires to be logged in under the same user account. In this embodiment, because user accounts are not checked before granting access, application 352 will grant access to the second computer even though it is logging in under a user account that has already logged in.

At some point, users will request educational content associated with particular courses such as videos 355, documents 354, and may wish to post or read information via postings 353. Accordingly, in step 538 the requested course content (videos, documents, etc.) will be delivered to the user computers as described above. At some point in time, the education application will trigger in step 542 a review of the user accounts that are logged in in order to detect if a single user account is logged in to more than one computing device. This trigger may occur periodically, e.g., daily or weekly, every hour, may occur randomly, may require manual input from an administrator, etc. Once a review is triggered, then in step 546 application 352 take steps to determine whether a single user account is currently logged into two or more computing devices. This review may occur as described above with respect to step 516, or as in FIG. 7.

If, in step 546 it is determined that only a single computing device is associated with every user account that is logged in, then control returns to step 538 where all currently logged in user accounts may continue to request course content. But, if it is determined that a particular user account is logged in on two more computing devices, then control moves to step 560 where desired access by the second computer (or more computers) is blocked.

Step 550 may be implemented in different manners. In one embodiment, a simple warning message is provided to the users on one or both (or more) of the computers logged in under the same user account warning that only a single computer may be logged in under a user account at a time. Alternatively, the second computer 430 logged in to the same user account as the first computer 330 will not be allowed on the content delivery network, the second computer will be logged off, access to the educational content will be denied, and a suitable message may be displayed on the second computer. If more than two computers are logged into the same user account, all computers maybe logged off except for the first computer logged on. In a further embodiment, the application 352 may also log out computer 330 in addition to denying access by computer 430. Yet further, the policy of the education company may be that only the latest login attempt is allowed for a single user account, meaning that once control moves to step 550 that computer 330 will be logged out, but telephone 430 will be allowed to log into the network 350. If multiple computers are logged into the same user account then only the last computer logged into that account will be allowed to stay logged in.

Once a user or computer is logged out, that computer is then unable to stream, view or download any videos 355 or documents 354. If a computer is logged out while a user is viewing a video, downloading or streaming a video, then that viewing, downloading or streaming is terminated at that time. In this fashion, this embodiment of FIG. 6 detects that a user is sharing his or her account with another user.

Prevent or Detect Account Sharing—Non-Simultaneous Use

The above flow diagrams describe the ability to prevent or detect account sharing that is happening (or has been) simultaneously. In addition, an embodiment of the invention allows the education application to deny access to a second or subsequent device if such access occurs within a certain time window, indicating that account sharing may be occurring. The above flow diagrams may be modified in the following way. As mentioned earlier, each action by a user while logged into the education application may be recorded in the database along with a timestamp. Thus, a history for each device is recorded indicating at what time an action was taken. Thus, in steps 504-512 and 534-538, actions are recorded as a user clicks or touches in order to watch videos, etc.

In step 516 in order to determine whether to block access by the second device attempting to log in (or to request content) the current time is compared to a time of a last action of the first device logged in in order to determine an elapsed time. This elapsed time is then compared to a predetermined time window to determine whether or not to block access by the second device. The predetermined time window may be any suitable time and typically ranges from about two minutes up to about two hours. Any subsequent device attempting an action within the predetermined time window (i.e., the elapsed time is less than the time window) may be denied access or blocked from completing that action. For example, if the predetermined time window is five minutes, and a second device logs in using the same user account as the first device, but a video ended on the first device 6 minutes ago, and since then there have been no user actions on the first device, then the second device will be allowed to log in or to request course content. The advantage is that near simultaneous sharing of user accounts may be prevented.

In step 546, when a review of user accounts is triggered, the latest timestamps for actions that have occurred on two more computing devices logged in under the same user account may be compared by reference to the database. These latest timestamps on the two devices may be subtracted to obtain an elapsed time. As above, the elapsed time is then compared to the predetermined time window and if the elapsed time is less than the window then access may be blocked by the second device as described in step 550. If the elapsed time is more, then the second device may continue to stream the video, or view other content.

In step 572 of FIG. 7, the question is whether a video has been playing on the other device within the predetermined time window, i.e., if the window is two minutes, the question is whether a video started on the second device within two minutes after a video ended on the first device. If so, then access is denied in step 576.

In a variation of the embodiment of FIG. 7, an exception may be made to allow a student to continue watching a particular video on a different device, especially if the student is moving from one location to another. The steps of FIG. 7 may be modified as follows. In step 564 if two devices are logged in under the same user account then control moves to step 568. Step 568 remains the same; if the devices are in the same class (e.g., both are mobile telephones), access is denied whether or not a video is being watched simultaneously on both devices or not because same devices tend to indicate account sharing by two or more individuals. Step 572 is modified to allow a video to be streamed (or a PDF file to be downloaded) after any video or PDF file has ended on the first device, because this tends to indicate that the same student has needed to switch from one device to another. One example is where the student is watching a video on his or her telephone while traveling, ends the video, and then begins watching on his or her laptop computer after arriving at home. In one specific embodiment, this exception may only be allowed when it is the same video that the student wishes to continue watching on the second device.

Prevent or Detect Account Sharing—Registration Embodiment

In one specific embodiment, registration of the devices of the user is used to prevent or detect account sharing. The above flow diagrams may be modified in the following way. When login information is received from a computing device for a particular user account (such as in step 504, 512 or 534) the user agent of that device is recorded (i.e., registered) in database 264 in conjunction with the unique identifier for that user account. Thus, over the course of time, as a student accesses the education application using his or her mobile telephone, laptop computer, tablet computer or other, each user agent for that device will be recorded. A limit may be imposed, allowing only three computing devices (for example) to be registered at a time.

Then, in step 516 or 546 in order to determine whether a second, third or fourth computing device should be allowed to log in or request content using the same user account, a check is made of database 264 to determine whether three devices have already been registered for this user account or not. If not, then the new computing device is allowed to log in or request content, as the case may be. If three devices are already registered for this user account, and the new device seeking to log in or request content is not one of the devices already registered (based upon the user agent), then the request is denied.

Another way to determine if the new device is not already registered uses the unique identifier. The unique identifier is temporal, i.e., when the user logs out or logs in again, it changes and will be different the next time the user logs in. The device footprint stays the same, save for the minor version of the operating system and browser, (i.e., we consider Windows 10.1 and Windows 10.2 to be identical and Chrome 44 and Chrome 45 to be identical; Windows 8 is not identical to Windows 10 regardless of the minor operating system versions and browser versions). Thus, devices that are logged in under the same user account will have different unique identifiers.

Prevent or Detect Account Sharing—Distance Embodiment

The above flow diagrams describe the ability to prevent or detect account sharing irrespective of the location of either device. This specific distance embodiment allows the education application to allow or deny access to a second or subsequent device depending upon the respective locations of both devices. This embodiment is especially useful if a student might be traveling (or not) from one location to another. Although this embodiment is described in the context of preventing account sharing, i.e., allowing or denying access in real-time as described in FIG. 5, this embodiment may be modified to detect account sharing after it has occurred, as described in FIG. 6.

Figure 8:
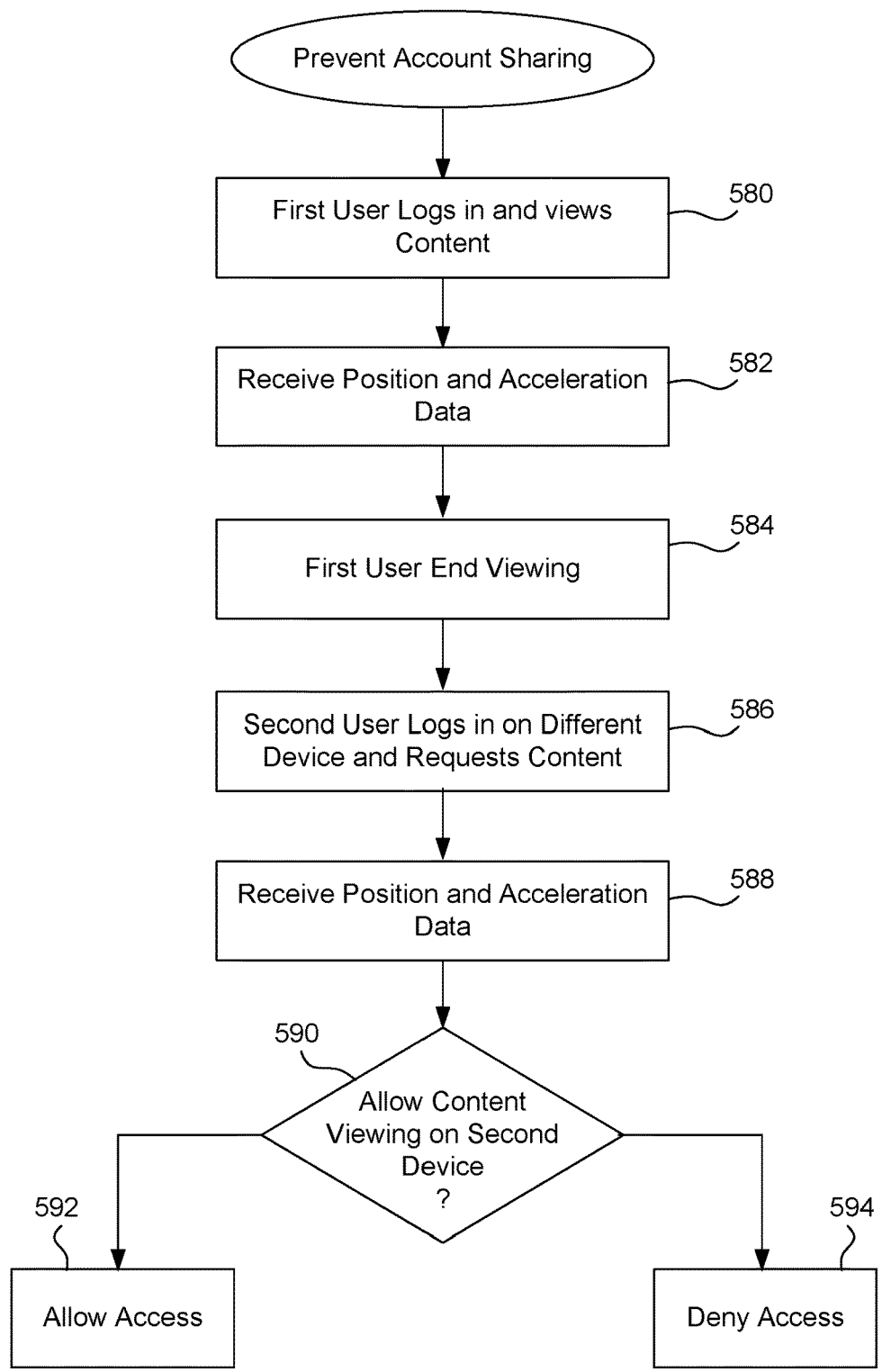
FIG. 8 is a flow diagram describing how account sharing may be prevented or detecting when two or more devices are in different locations.

FIG. 8 is a flow diagram describing how account sharing may be prevented or detecting when two or more devices are in different locations. In step 580 a first user logs into the education application on a first computing device and begins viewing content, such as has been described in steps 504-508. At the time of logging in (or shortly thereafter, or when viewing begins), position and acceleration data are received at the education application from the first device. Rough position data may be determined based upon the IP address of the device or upon Wi-Fi triangulation. Finer data may be based upon a GPS unit of the device. Most all mobile telephones include such a unit, and many tablet computers and laptop computers contain such units or will in the near future.

In addition, most all telephones will include an accelerometer which provides the acceleration data, thus indicating if the device is moving. Based upon this data, an initial determination is made as to the location of the first device and whether or not it is in motion. For instance, accelerometer data and geolocation data may be used to detect if the student is traveling at a speed corresponding to that of an automobile, train, airplane etc. Accelerometer data be sampled over a period of time or looked at historically to determine acceleration or speed.

Thus, a student traveling at a certain speed for a given amount of time may be allowed to log in under the same user account and watch a video on a different computing device at a distant location. It is also possible that no position or acceleration data is received from the first device, which may be the case with certain tablet, laptop or desktop computers, or with mobile telephones which do not permit that data to be shared.

In step 584 the first user ends the viewing of the video or PDF document on the first device. Because simultaneous viewing on a different device is not allowed in this embodiment, a prerequisite to allowing viewing of a different device in a different location is that viewing end on the first device. Even if the first user does not log out, viewing content on a second device may still be allowed as the first user may have simply forgotten to log out. In a variation, we may also implement a time out for the first device, so that even if the first user forgets to log out, viewing content on a second device may still be allowed for a short amount of time.

In step 586 at a later time, a second user (perhaps the same user) logs into the education application using a different device but under the same user account that was used in step 580 and requests to view content (e.g., download or stream a video, download or view a PDF document) such as has been described in step 512. Logging in under the same user account using the same computing device as in step 580 will be allowed because it is very likely the same user, even if the location is different. In step 588 position and acceleration data is received from the second device by the education application in the same manner as has been described in step 582.

Step 590 determines whether or not to allow the request to view content on the second device depending upon a number of factors including: position and acceleration data of each device, elapsed time between requests, specific content requested and incongruity of content requested.

Various policies may also be used. For example, the request may only be allowed if the second device is within 200 miles of the first device (the range within which the first user may reasonably travel on a given day at a plausible speed). The elapsed time between step 584 and step 586 may also be used to determine a reasonable distance that the first student may have traveled via automobile. Or, it may be assumed that students are likely to travel by airplane, in which access is allowed unless the distance between the two devices is greater than about 3,000 miles and the elapsed time is less than about four hours (for example).

In another example, access may always be allowed if the content requested on the second device is the same as the content that was being viewed on the first device. I.e., if the first device was streaming an Economics 101 video, then a request from the second device to also stream that same video will be allowed because it is likely that it is the same student watching, even though the devices are different, and account sharing is not occurring.

The accelerometer data may also be used depending upon the policy. In yet another example, if the accelerometer data from the first device indicates that the device is moving, and a speed can be estimated, then access may be allowed from the second device at a distant location depending upon the estimated speed and elapsed time. For example, if accelerometer data from the first device indicates that the device was in an airplane taking off, then an estimated speed of that airplane along with the elapsed time may be used to determine a reasonable distance at which the second device may be located. Access will then be allowed if the second device is within that distance. In yet another example, if the accelerometer in the first device does not indicate that the device is moving, then the location of the second device may be restricted to be within a short range (e.g., 10 miles), unless a number of hours pass, in which case that range may be extended. Conversely, if two mobile devices are logged into the same account and they are moving in different directions or are in different locations, then it is likely different users are using the same account and one or both accounts will be logged out. If two mobile devices are logged into the same account but are in same location with the same accelerometer data, the student may have simply forgotten to log out of one device (e.g., his or her iPad), and is viewing videos on another device (e.g., his or her telephone), and neither account will be logged out automatically.

In another example where being logged in on two devices may be allowed, is when the student is in transit and is logged in on both a computer (for example) and on his or her mobile telephone. If logging is in is allowed for two types of devices, then even though the student may have forgotten to log out of his or her computer at home, the mobile device will be allowed access if it is in motion.

In yet another example, it is also possible that as soon as one student logs out another student may log in immediately (or sometime later) on a different computer using the same user account—which is also account sharing. In this example, the invention detects when a different student logs in using the same user account as another student who has recently logged out. As each new login occurs, the NoSQL database is consulted to determine if the user account attempting to log in had been last active within a predetermined time period. This predetermined time period may be set to be anywhere from one minute up to one hour, for example, and indicates a time period during which it is unlikely that the actual owner of the account would be able to travel to a different location to log in using a different device. If this same user account had been last active within the predetermined time period, and a different computing device is now being used to log in from a geographic location that is outside of a predetermined distance from the location of the last session of that user account, then this is indication that the user account is being shared improperly. The predetermined distance may be set to be any suitable distance outside of which it is unlikely that the actual owner of the account could travel within the predetermined time period.

The new login attempt must be within the predetermined time period because this indicates that it is unlikely that the user himself or herself has been able to travel to that new location. A different computing device indicates that it is truly a different user trying to login under the same user account and not the actual owner of the account with his or her computing device. And, detecting that the new login comes from a geographic location outside of a predetermined distance indicates that it is unlikely that the user who was logged in during the last session has been able to travel to the new location, indicating that another student is sharing the user account. If these conditions are true, then control moves to step 520 and access may be blocked as described above. If not, then control moves to step 508.

Accordingly, if access is allowed in step 592 then the content requested in step 586 may be viewed on the second device, if not, then in step 594 access is denied to the second device and streaming, downloading, viewing etc., will not be allowed on the second device, or such activity may be terminated if ongoing.

Prevent or Detect Account Sharing—Time Embodiment

In this embodiment, if the same user account is accessing the education application using different user agents and/or session identifiers, the application can query the in-memory database to check for any actions within a certain period of time to allow a student to be logged in on two different devices. Thus, a user who logs in on his or her own home computer at noon, watches a video and then leaves for class at 2 p.m., may still be logged in later in the day at 4 p.m. on that same home computer. It may be desirable to then allow that same student to log in to the education application using their mobile telephone while on campus at 4 p.m., even though their home computer is still logged in. Thus, when the education application determines using the in-memory database that a single user account is logged in on two different devices, it queries that database to determine which actions have occurred on those devices with a certain period of time.

Figure 9:
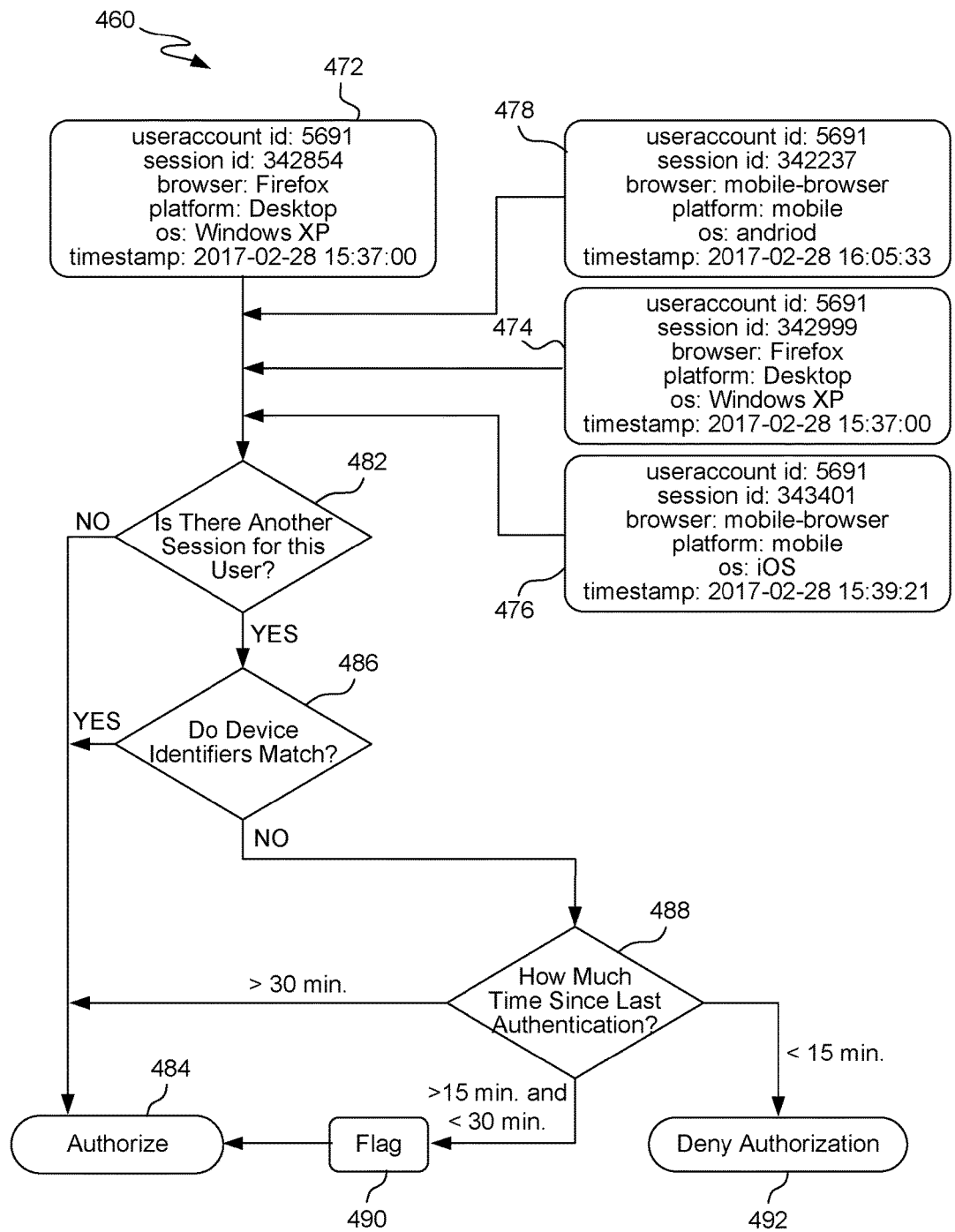
FIG. 9 is a flow diagram describing how a student may be allowed access or denied access to a particular user account depending upon how much time has elapsed since a first authentication or use of the particular user account.

FIG. 9 is a flow diagram describing how a student may be allowed access or denied access to a particular user account depending upon how much time has elapsed since a first authentication or use of the particular user account. The time limits shown in the figure are for example only; of course, the values of the times may be changed to address a particular business need.

Users 472-478 are represented in the in-memory database 264 by the information shown such as their user account identifier, session identifier, device identifiers such as browser, platform and operating system, and any number of timestamps indicating when a login or an action occurred on a particular device.

In this example, a first user logs into the user account (or takes an action such as streaming a video) using his or her desktop computer at 3:37 p.m. as shown at 472. Because no other session has been established for this user account, control moves to step 482 and the first user is allowed access to request and view course content. Next, as represented at 474, the same user on the same device may take an action such as opening an "incognito" window or clearing "cookies" from a browser; this action creates a new session, and would be allowed via steps 482, 486 and 484.

Next, as represented at 476 at 3:39 p.m., another user (or perhaps the same user) logs into the same user account on his or her mobile telephone. Because there is already another session in use (472), control moves to step 486 and it is determined that the device identifiers do not match. Accordingly, step 488 determines that less than 15 minutes has elapsed and in step 492 this user on this device is denied access to the education application. The reason is that because two different devices are being used at the same time (or very nearly the same time, within a short time window), this is a likely indication that a single user account is being shared between two or more students.

Next, as represented at 478 at 4:05 p.m., another user (or perhaps the same user) logs into the same user account on a different mobile telephone. Because there is already another session in use (472), control moves to step 486 and it is determined that the device identifiers do not match. Accordingly, step 488 determines that greater than 15 minutes but less than 30 minutes has elapsed and in step 490 this user this device is flagged as possibly sharing a user account but access to the education application is allowed. The reason is that it is possible that this is the same user, but further review is needed.

Although not shown, it is possible that a user on another device different from the device of 472 may attempt to log in to the same user account (or attempt to stream a video or download a PDF file) at least 30 minutes later than the timestamp of 472. In this situation, control would pass through steps 482, 486 and 488, eventually allowing access in step 484. The reason is that even though two different devices are being used, it is likely that since greater than thirty minutes have passed, this is the normal behavior of a student changing devices because he or she is traveling between home and school, between school and work, etc.

Identification of Videos and Enrolled Courses Mismatch

In order to prevent or detect that students are sharing accounts, a second embodiment involves identifying when a user is attempting to watch videos corresponding to more than a maximum number of courses. For example, if a user is only allowed to watch videos corresponding to four courses during a semester, but attempts to watch videos representing five or more courses, this may be an indication that the user is sharing his or her account with another user.

Should it be detected that a user is attempting to watch more videos than allowed, the application may prevent access to any more videos or display a warning message. Or, the application may allow access to any videos at any time, but may then periodically check to determine if a user account is being used to watch more than the allowed number of videos. If so, the user may be logged out, a warning message may be given, videos may be restricted, etc.

The technique involves tracking the number of courses in which a student is enrolled, the number of videos that a student is watching via their account, or the number of documents that a student is opening or downloading. That is, the application keeps track not only of videos that a student streams (and to which course each video pertains), but also keeps track of which electronic documents (such as PDF files) a student is opening or downloading and identifies the course or courses associated with each document. Because videos and study resources are organized under parent courses, these videos and resources are associated with the courses automatically. For example, the videos are placed under the parent courses in an internal folder in a tree hierarchy. The external title of the video does not necessarily need to contain the course title in order to be associated with the course, but it may.

FIG. 10 is an example from a school database showing a student's schedule. A record 610 in a database shows the entire student schedule for spring quarter, and column 612 shows the actual courses that a student is taking. A student may print this record and bring it to the education provider's offices, may e-mail it, or may display it to an administrator on a computing device, and information may be entered into a database of the education application. This school database may also be accessed automatically by the education application 352 as explained below in order to access classes that the student is taking. Record 610 shows that the student is taking three courses; in one embodiment, the application may only be required to know the number of courses that the student is taking (e.g., three), and may not necessarily need the course numbers.

The education application may automatically access the student's registration for a semester at a university to obtain a list of the actual courses that the student is taking. Using a suitable API to access a university database of student records, the education application retrieves the actual list of classes and/or class codes that a student is taking for a particular semester and will populate its own database, which may appear as shown in FIG. 10. This access may be performed by requiring the student to provide authorization to access his or her student class schedule. This is typically done with a Single-Sign-On (SSO) implementation (e.g., using SAML or SAML2) with the college or university authentication system. In the case of the University of Florida (and most other universities), the Shibboleth (a derivative of SAML2) authentication system is used. The student logs in with his or her university credentials and is then redirected to an SSO page at the university's Web site. Once the student logs in, he or she grants permission to the education application to access certain, limited data regarding the student's course schedule. The application then imports this schedule data into a database as a list of "active/enrolled" courses for the student, and it may be displayed as shown in FIGS. 10 and 11. Once the application has imported the active courses for the user, it can then limit or block access to content that does not match the logged-in student's enrolled courses, as will be described below.

FIG. 11 is a screenshot of a report from a database of videos watched in a student account. Field 620 is a timestamp (date and time), field 622 is a unique identifier per student of a student account, field 624 is a student name, field 626 is the school at which the student attends, field 628 is the name of the video or PDF file viewed, field 630 indicates what type of file (or length of video), field 632 indicates the number of tokens used on the listed file, followed by the number of tokens remaining in the student's account.

FIG. 12 is a screenshot 650 of a report from a database of a student who has watched three videos. Field 660 is a timestamp (date and time), field 662 is a unique identifier per student of a student account, field 664 is a student name, field 666 is the school at which the student attends, field 668 is the name of the video or PDF file viewed, field 670 indicates what type of file (or length of video), field 672 indicates the number of tokens used on the listed file, followed by the number of tokens remaining in the student's account.

Prevent Account Sharing via Courses—Flow Diagram

The application may prevent account sharing instead of or in addition to detecting account sharing as described in more detail below. Thus, during a particular semester, a database 264 is used to keep track of the courses for which a student has watched videos. For example, it is known that a student has watched a number of videos corresponding to four courses. And, it is known that the student is enrolled in four courses that semester. When the student logs into the system and attempts to begin streaming a video that represents a fifth course, different from the courses he or she has already watched, then the application may display a warning to the student, or may even block the streaming of the requested video to the student's device.

Figure 13:
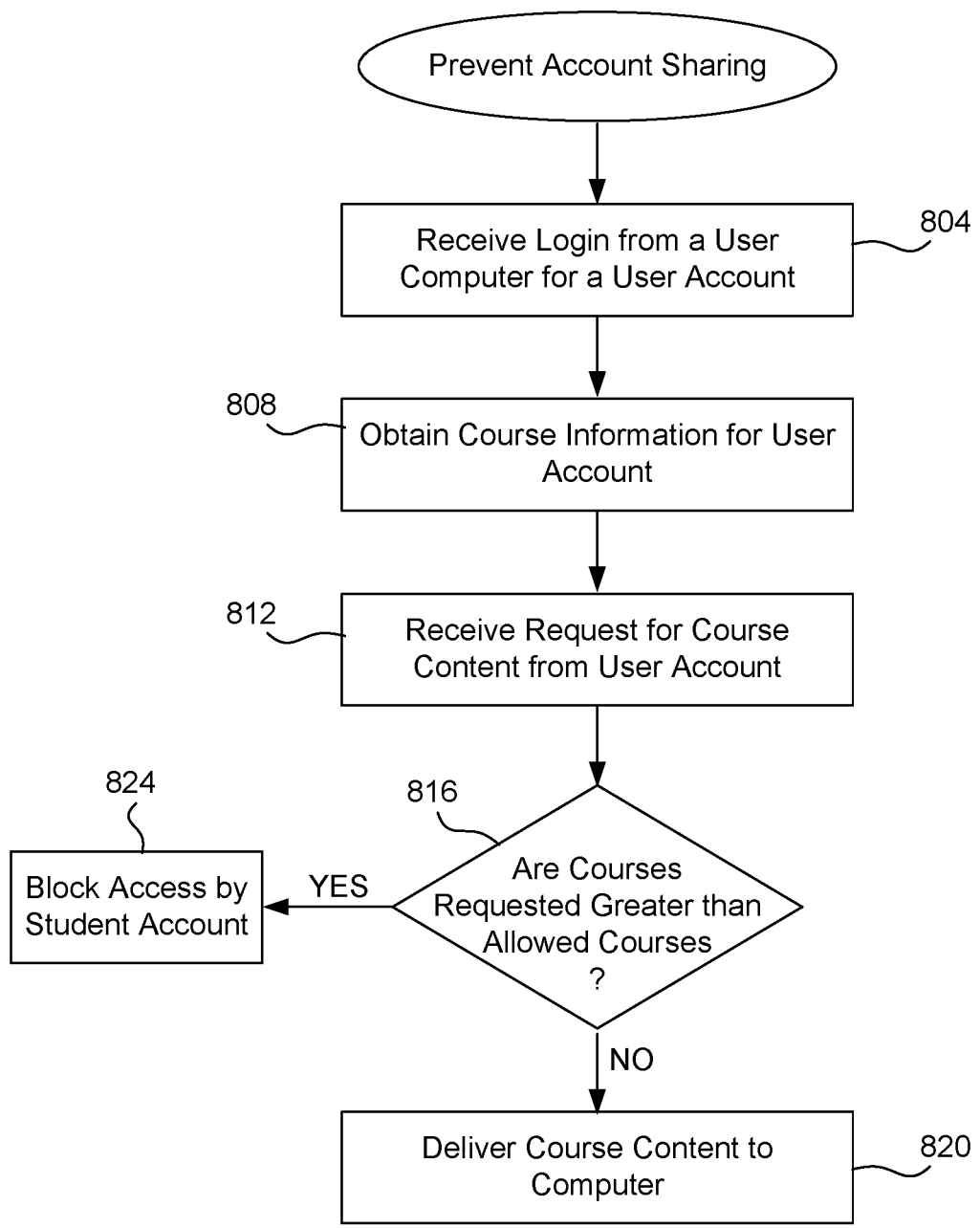
FIG. 13 is a flow diagram describing preventing account sharing by comparing courses watched with courses allowed.

FIG. 13 is a flow diagram describing how account sharing may be prevented. In a first step 804, a login for a particular student account is received from a user computer and the student account is granted access to educational content on server 350 via the education application 352 as described above. For instance, an authentication server provides to the education application 352 some type of identifier identifying a student account that is now logged in on a computer.

In order to compare videos watched with the actual courses that a student is enrolled in, in step 808 the application obtains the course information for a particular student account. Because each student within the application is identified by a unique identifier, and because each student account may include other identifying information such as full name, date of birth, social security number etc., this identifying information may be used to access the course information for that student at a particular institution. For example, if the student is enrolled at a university, a suitable API is used by the education application to retrieve course information for that student from a university database, and such course information is shown in FIG. 10.

At some point, the user will request educational content associated with a particular course such as videos 355, documents 354, and may wish to post or read information via postings 353. Accordingly, in step 812 such a request is received from the user account at the education application. Because each video, document etc., available via the education application includes within its name the course number to which the video or document pertains (or each video is associated with the course number), the request from the user will identify a particular course at his or her university. Row 640 in FIG. 11 shows a video name 628 that includes the course number. Other techniques may also be used to request course content. I.e., the identification of the content (video, PDF, etc.) that the user is requesting would not necessarily, or only, be done via the name of the content itself. Each item of content in the education application has relational data as well as meta-data associated with it. The relational data for a given item of content will reference a course or subject identifier. Using this identifier, the content the user is requesting is relationally linked to its course, irrespective of the name of the piece of content.

Because it is possible that the student who is the actual owner of the account has shared the account (i.e., the login credentials for that account) with another student, a check is performed in step 816 to determine whether or not the number of courses represented by the videos or documents that a student has watched is greater than the number of courses that are allowed for that student. The number of courses allowed may be determined in different manners. In one embodiment, a student who has registered with the education application is only allowed to watch videos representing a certain number of courses per semester, e.g., no more than four courses per semester. Or, the limit may be three courses per month or other time period. This number of courses may vary by university, by student, by monthly amount paid, etc. In another embodiment, the number of courses allowed is determined by the actual number of courses in which the student is enrolled at the university. For example, FIG. 10 shows a student schedule for the spring semester in which the student is enrolled in three courses. Accordingly, the student will only be allowed to watch videos representing at most three courses.

Other techniques may also be used to determine what is the allowed number of courses for which a student may watch videos. For example, by setting a standard limit per membership level of the user account, by setting a global limit of "X" (e.g., three) courses for all user accounts, or, the course limit may be determined by the year in school, e.g., there are more general education courses required in the first two years of college, so those students would be allowed more courses.

In order to determine the number of courses represented by the videos that a student has requested, reference may be made to a database of videos requested by each student account, examples of which are shown in FIGS. 11 and 12. For example, FIG. 11 shows that a particular user account has requested seven different videos in a particular time period, each video including the course identifier (e.g., "PHY2054") in its name 628. These seven videos represent six different courses (the last two rows identify two different videos but they are for the same course). Thus, a student account that is only allowed five courses worth of videos would be over the allowed amount, while an account that is allowed six courses would not be over. FIG. 12 shows a portion of this database for another user in which three videos were watched on a particular day. These videos represent two different courses as shown by the course identifiers in each video name Thus, a student account that is only allowed three courses worth of videos would be under the limit at this point in time.

Accordingly, the application then determines the number of courses associated with these videos that have been watched in the relevant time period (or PDF files being downloaded) by reference to the database entries for a particular user account. As explained above, the course identifiers are used to determine the actual number of courses watched. The application then determines if the number of courses represented by these videos (including the pending request in step 812) is more than the number of courses that a student is taking (or more than the number of courses allowed). If not, then in step 820 the requested course content is delivered to the user computer 330, which may be a user computer system 30 or a user mobile device 60. The user may then view the course content he or she wishes either at that time (if a streaming video or if document that may only be displayed), or may view the course content later (perhaps by logging out and logging in a future time) if the video or document is allowed to be downloaded and stored on the user computer.

On the other hand, if the number of courses requested is greater than the allowed number, then in step 824 access to the content delivery network 350 may be blocked or the student account may be flagged. Each student account that is flagged will automatically generate a warning e-mail message that is sent to the owner of the account indicating that too many videos or PDF files are being viewed for the number of classes enrolled in, that a student account may not be shared with other students, and that future misuse will lead to being banned from the resource or the account being frozen or suspended. If at a later time, it is determined that too many videos and/or PDF files are still being streamed, viewed or downloaded, access to the student account may be blocked. Alternatively, the application may immediately prevent streaming or downloading of videos to any device logged in to the student account, or may prevent the downloading or viewing of PDF files. Other actions that may be taken include: revoking a certain number, or all, of the student's tokens; requiring a student to purchase a higher level of membership; creating a temporary (e.g., 15 minute) block on viewing content from the student's account; or, creating a temporary block that requires the student to call or come in person to provide a reason for their usage.

Detect Account Sharing via Courses—Flow Diagram

The application may also detect account sharing. A database 264 is used to keep track of which students have watched which videos. Periodically, the application triggers a review of an account or accounts to determine if courses for which videos are requested are greater than the number of allowed courses for that account. If so, then the application may display a warning to the student, or may even block the streaming of the requested video or document sent to the student's device.

Figure 14:
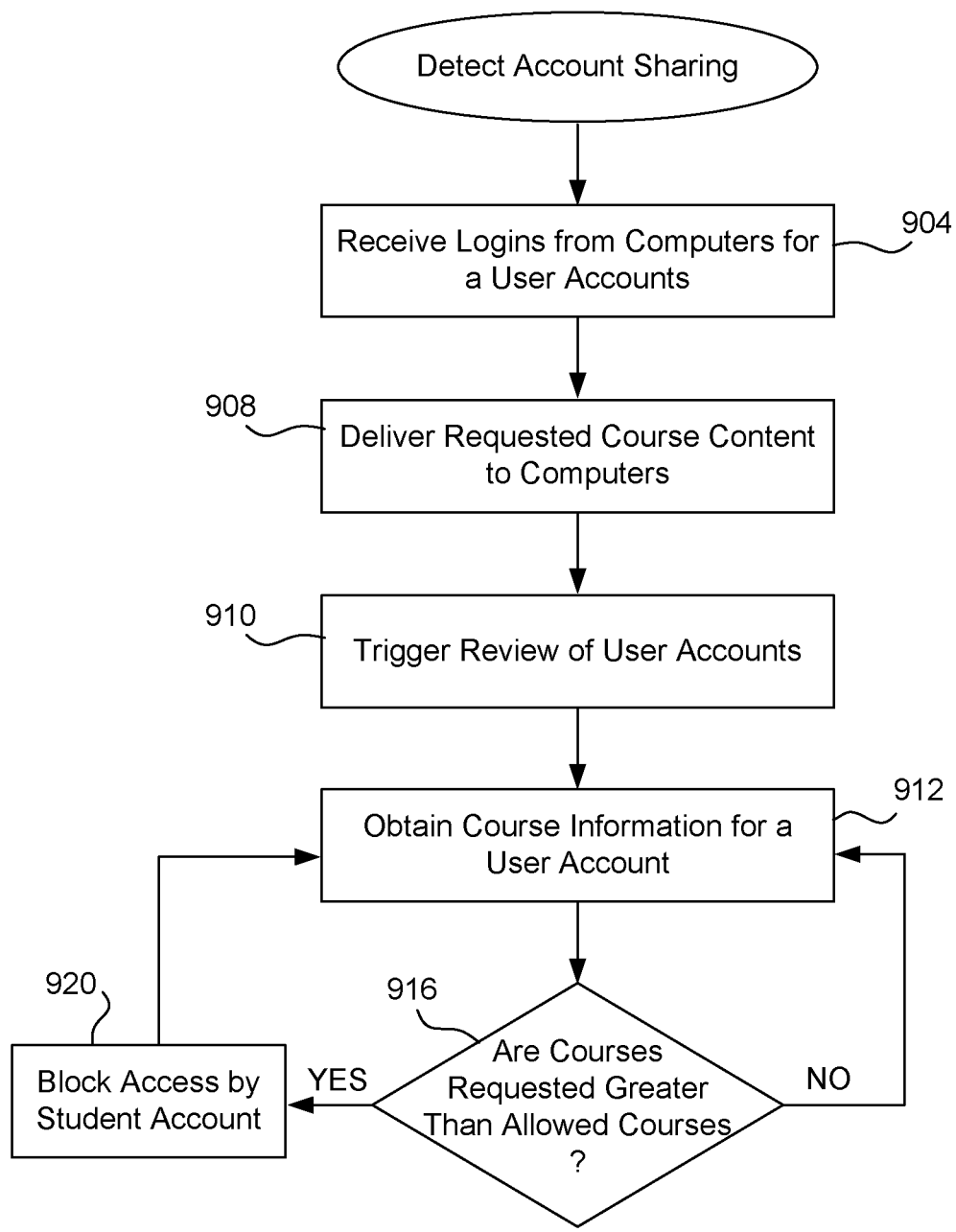
FIG. 14 is a flow diagram describing detecting account sharing by comparing courses watched with courses allowed.

FIG. 14 is a flow diagram describing how account sharing may be detected. In a first step 904, logins for any number of student accounts are received from computers (e.g., computers 330 and 430) and each account is granted access to educational content from a server computer 350 via the education application 352. For example, students supply login credentials and are authenticated using any of the techniques described above, and, once authenticated, authentication server 344 provides, as shown at 366, certain personal user information for each user such as name, e-mail address, unique identifier, etc., to the education application 352 to indicate that each computer is now authorized to access educational content. Thus, an authentication server provides to the education application 352 some type of identifier identifying each student account that is now logged in on a computer.

It is possible that a person who is the actual owner of a user account will illicitly share that account with another person and this other person will then attempt to log in to the education application. In other words, a second person (or even the first person) logs in using the same login credentials as before but on a different computer, for example, mobile telephone 430 as shown in FIG. 4. In this embodiment, because user accounts are not checked before granting access, application 352 will grant access to the second computer even though it is logging in under a user account that has already logged in. It is also possible that another student will log in at a different time than the actual owner of the account, or may be allowed to use the computer of the owner.

At some point, students will request educational content associated with particular courses such as videos 355, documents 354, and may wish to post or read information via postings 353. Accordingly, in step 908 the requested course content (videos, documents, etc.) will be delivered to the student computers as described above.

In step 910, the education application will trigger a review of the student accounts in order to detect if students are sharing accounts. This trigger may occur periodically, e.g., every hour, may occur randomly, may require manual input from an administrator, etc. An account need not be logged in in order to be subject to review. Accounts may be reviewed one at a time, or may be reviewed when there is an attempt to watch videos beyond an allowed course limit or if there are incongruous course being viewed.

In order to compare videos watched with the actual courses that a user is enrolled in, in step 912 the application obtains the course information for a particular user account. Because each user within the application is identified by a unique identifier, and because each user account may include other identifying information such as full name, date of birth, social security number etc., this identifying information may be used to access the course information for that user at a particular institution. For example, if the user is a student enrolled at a university, a suitable API is used by the education application to retrieve course information for that user from a university database, and such course information is shown in FIG. 10.

Because it is possible that the student who is the actual owner of the account has shared the account (i.e., the login credentials for that account) with another student, and that the other student has been watching videos corresponding to courses, a check is performed in step 916 to determine whether or not the number of courses represented by the videos or documents associated with the particular student account is greater than the number of courses that are allowed for that student account. This check may be performed as described in step 816 above.

If the courses watched are within the allowed courses then control may return to step 912 in order to obtain the course information for a different student account and to perform a check on that account.

On the other hand, if the number of courses requested is greater than the allowed number, then in step 920 access to the content delivery network 350 may be blocked or the student account may be flagged. Each student account that is flagged will automatically generate a warning e-mail message that is sent to the owner of the account indicating that too many videos or PDF files are being viewed for the number of classes enrolled in, that a student account may not be shared with other students, and that future misuse will lead to being banned from the resource or the account being frozen or suspended. If at a later time, it is determined that too many videos and/or PDF files are still being streamed, viewed or downloaded, access to the student account may be blocked. Alternatively, the application may immediately prevent streaming or downloading of videos to any device logged in to the student account, or may prevent the downloading or viewing of PDF files. If the student account is not currently logged in, then such streaming or downloading may be prohibited in the future when the account is logged in. After such action is taken, then control may return to step 912 to perform a check on another student account.

Computer System Embodiment

Figure 15:
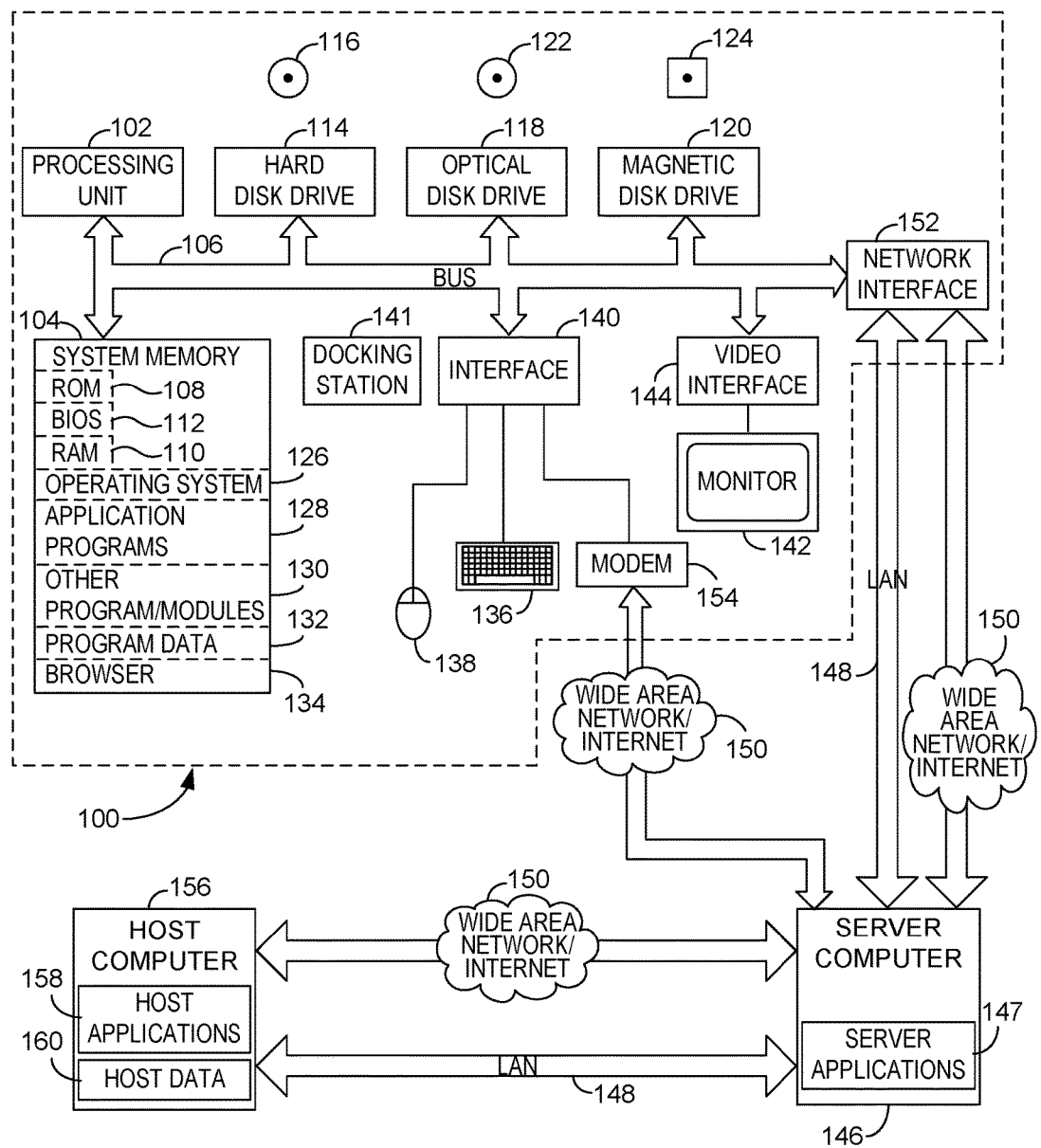
FIG. 15 illustrates a computer system suitable for implementing embodiments of the present invention.

FIG. 15 in cooperation with the above provides a general description of a computing environment that may be used to implement various aspects of the present invention. For purposes of brevity and clarity, embodiments of the invention may be described in the general context of computer-executable instructions, such as program application modules, objects, applications, models, or macros being executed by a computer, which may include but is not limited to personal computer systems, hand-held devices, multiprocessor systems, microprocessor-based or programmable consumer electronics, network PCs, mini computers, mainframe computers, and other equivalent computing and processing sub-systems and systems. Aspects of the invention may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer since, in typical embodiments, there will be more than one computer or other device involved. The processing unit 102 may be any logic processing unit, such as one or more central processing units (CPUs), digital signal processors (DSPs), application-specific integrated circuits (ASICs), etc.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The application programs 128, program or modules 130, and program data 132 may include information, instructions and parameters for creating, manipulating, scoring, ranking, uploading, and processing information to determine a best-fit match between students and tutors, to determine a certification of a tutor, provide filtering by a course code, etc. The system memory 104 may also include a browser 134 for permitting the computer 100 to access and exchange data with sources such as Web sites of the Internet, corporate intranets, or other networks as described above, as well as other server applications on server computers such as those further discussed above. In one embodiment, the browser 134 may be used to access course materials, view a tutor profile, and share information (e.g., questions or comments) with a tutor or otherwise build-up databases of information that may be customized for a variety of purposes in a learning environment. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a tablet, a television, a personal data assistant (PDA), a mobile telephone (or other mobile device).

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. Another interface device that may be coupled to the bus 106 is a docking station 141 configured to receive and electronically engage a digital pen or stylus for the purpose of data transmission, charging, etc. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of preventing account sharing, said method comprising:
   receiving first information from an authentication computer that has authenticated a user of a first computing device, said first information identifying a user account of an education application;
   logging in said first computing device to said education application and streaming a first video from a server computer to said first computing device;
   receiving second information from said authentication computer that has authenticated a user of a second computing device different from said first computing device, said second information also identifying said user account of said education application, said receiving occurring while said first computing device is logged in;
   determining that said first information and said second information both identify said user account;
   determining that device information from said authentication computer for said second computing device is different from device information for said first computing device stored in a database; and
   preventing said second computing device from logging in to said education application unless it is determined that said streaming of said first video to said first computing device has ended, that said first and second computing devices are in different device classes, and that said second video streamed to said second computing device is the same as said first video streamed to said first computing device.

2. A method as recited in claim 1 further comprising:
   authenticating said user of said first computing device by authenticating login credentials received from said first computing device; and
   authenticating said user of said second computing device by authenticating said login credentials received from said second computing device.

3. A method as recited in claim 1 wherein said user of said first computing device is the same as said user of said second computing device.

4. A method as recited in claim 1 further comprising:
   only allowing said second computing device to stream said second video from said server computer when it is determined that said first and second computing devices are located in the same computer laboratory.

5. A method as recited in claim 1 further comprising:
   preventing said second computing device from logging in to said education application when an elapsed time between a last action performed on said first computing device and said receipt of said second information is less than a first predetermined time; and
   allowing said second computing device to log in to said education application when said elapsed time is greater than a second predetermined time, said second predetermined time being greater than or equal to said first predetermined time.

6. A method of detecting account sharing, said method comprising:
   logging in a plurality of computing devices to an education application and recording a user account for each computing device in a database, each user of one of said computing devices having been authenticated;
   streaming a first video from a server computer to at least a first one of said computing devices;
   determining that a first user account for said first one of said computing devices is the same as a second user account for a second one of said computing devices, both said first and second computing device being logged in to said education application at the same time;
   determining that device information stored in said database for said second computing device is different from device information for said first computing device stored in said database; and preventing said second computing device from streaming a second video from said server computer by said education application unless it is determined that said streaming of said first video to said first computing device has ended, that said first and second computing devices are in different device classes, and that said second video streamed to said second computing device is the same as said first video streamed to said first computing device.

7. A method as recited in claim 6 further comprising:

authenticating each of said users by authenticating login credentials received from each of said users.

8. A method as recited in claim 6 wherein a user of said first computing device is the same as a user of said second computing device.

9. A method as recited in claim 6 further comprising:

logging off said second computing device from said education application.

10. A method as recited in claim 6 further comprising:

only allowing said second computing device to stream said second video from said server computer when it is determined that said at least one and said second computing devices are located in the same computer laboratory.

11. A method as recited in claim 6 further comprising:

preventing said second computing device from streaming said second video when an elapsed time between a last action performed on said at least one computing device and a last action performed on said second computing device is less than a first predetermined time; and allowing said second computing device to stream said second video when said elapsed time is greater than a second predetermined time, said second predetermined time being greater than or equal to said first predetermined time.

* * * * *